United States Patent
Yang et al.

(10) Patent No.: US 10,273,107 B2
(45) Date of Patent: *Apr. 30, 2019

(54) SYSTEMS, DEVICES AND METHODS FOR RECEIVING AN ITEM

(71) Applicant: United States Postal Service, Washington, DC (US)

(72) Inventors: Dongliang Yang, Ellicott City, MD (US); James E. Goodbar, III, Springfield, VA (US)

(73) Assignee: United States Postal Service, Washington, DC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/799,748

(22) Filed: Oct. 31, 2017

(65) Prior Publication Data

US 2018/0050882 A1 Feb. 22, 2018

Related U.S. Application Data

(63) Continuation of application No. 15/357,869, filed on Nov. 21, 2016, now Pat. No. 9,840,390, which is a (Continued)

(51) Int. Cl.
*B65H 29/26* (2006.01)
*B65H 31/08* (2006.01)
(Continued)

(52) U.S. Cl.
CPC ............. *B65H 29/26* (2013.01); *B07C 1/025* (2013.01); *B07C 3/02* (2013.01); *B07C 5/00* (2013.01);
(Continued)

(58) Field of Classification Search
CPC ........ B65H 29/26; B65H 29/46; B65H 31/24; B65H 31/02; B65H 31/06; B65H 31/08;
(Continued)

(56) References Cited

U.S. PATENT DOCUMENTS 3,266,798 A   8/1966   Bleiman
3,704,793 A   12/1972  Nicol et al.
(Continued)

*Primary Examiner* — David H Bollinger
(74) *Attorney, Agent, or Firm* — Knobbe Martens Olson & Bear LLP

(57) ABSTRACT

Systems, devices and methods for receiving an item in a receptacle are disclosed. Features are disclosed for receiving and guiding an item in a receiving space of a receptacle so as to attenuate or remove the impact force of the item on the receptacle. Some embodiments of the disclosure include a bumper having an impact surface which absorbs most or all of the impact force of the item and thereby mitigates or removes the imposition of cyclic impact loads on the receptacle from repeated receipt of items. The bumper may be structurally and/or functionally de-coupled or otherwise physically separated from the receptacle such that an advantageous division of labor is created between absorbing the impact and receiving the item. This disclosure may be useful, for example, in modern industrial operations where a high volume of items are received daily, such as in mail sorting and handling operations.

18 Claims, 11 Drawing Sheets

Related U.S. Application Data continuation of application No. 14/848,989, filed on Sep. 9, 2015, now Pat. No. 9,505,577.

(60) Provisional application No. 62/049,932, filed on Sep. 12, 2014.

(51) Int. Cl.
| | |
|---|---|
| *B65H 31/06* | (2006.01) |
| *B65H 31/02* | (2006.01) |
| *B65H 29/46* | (2006.01) |
| *B65H 31/24* | (2006.01) |
| *B07C 5/00* | (2006.01) |
| *B07C 1/02* | (2006.01) |
| *B65H 39/075* | (2006.01) |
| *B65H 39/115* | (2006.01) |
| *B07C 3/02* | (2006.01) |
| *F16F 7/00* | (2006.01) |

(52) U.S. Cl.
CPC ............ *B65H 29/46* (2013.01); *B65H 31/02* (2013.01); *B65H 31/06* (2013.01); *B65H 31/08* (2013.01); *B65H 31/24* (2013.01); *B65H 39/075* (2013.01); *B65H 39/115* (2013.01); *F16F 7/00* (2013.01); *B65H 2301/42146* (2013.01); *B65H 2301/422548* (2013.01); *B65H 2403/60* (2013.01); *B65H 2405/221* (2013.01); *B65H 2405/3312* (2013.01); *B65H 2701/1916* (2013.01)

(58) Field of Classification Search
CPC .. B65H 2301/4214; B65H 2301/42146; B65H 2301/4217; B65H 2405/21; B65H 2405/211; B65H 2405/22; B65H 2405/221; B65H 2405/331; B65H 2405/3312; B65H 2405/35; B65H 2405/36

See application file for complete search history.

(56) References Cited

U.S. PATENT DOCUMENTS

| | | |
|---|---|---|
| 3,744,790 A | 7/1973 | Hoffman |
| 5,199,700 A | 4/1993 | Fairey et al. |
| 5,362,040 A | 11/1994 | Midavaine et al. |
| 5,462,268 A | 10/1995 | Remy et al. |
| 8,485,522 B2 | 7/2013 | Schererz et al. |
| 8,752,837 B2 | 6/2014 | Iwata et al. |
| 9,505,577 B2 * | 11/2016 | Yang ..................... B65H 31/08 |
| 9,840,390 B2 * | 12/2017 | Yang ..................... B65H 31/08 |

* cited by examiner

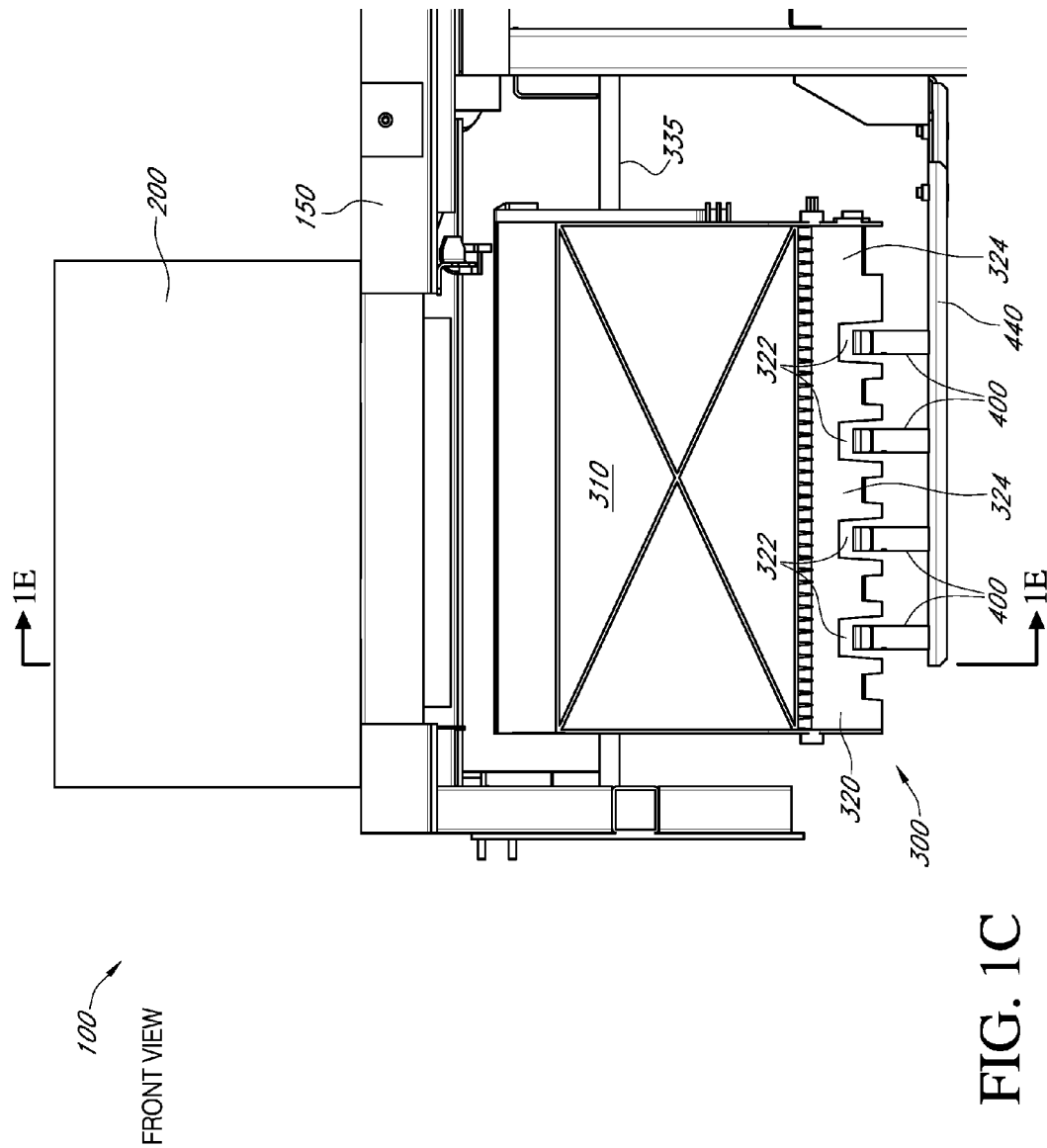

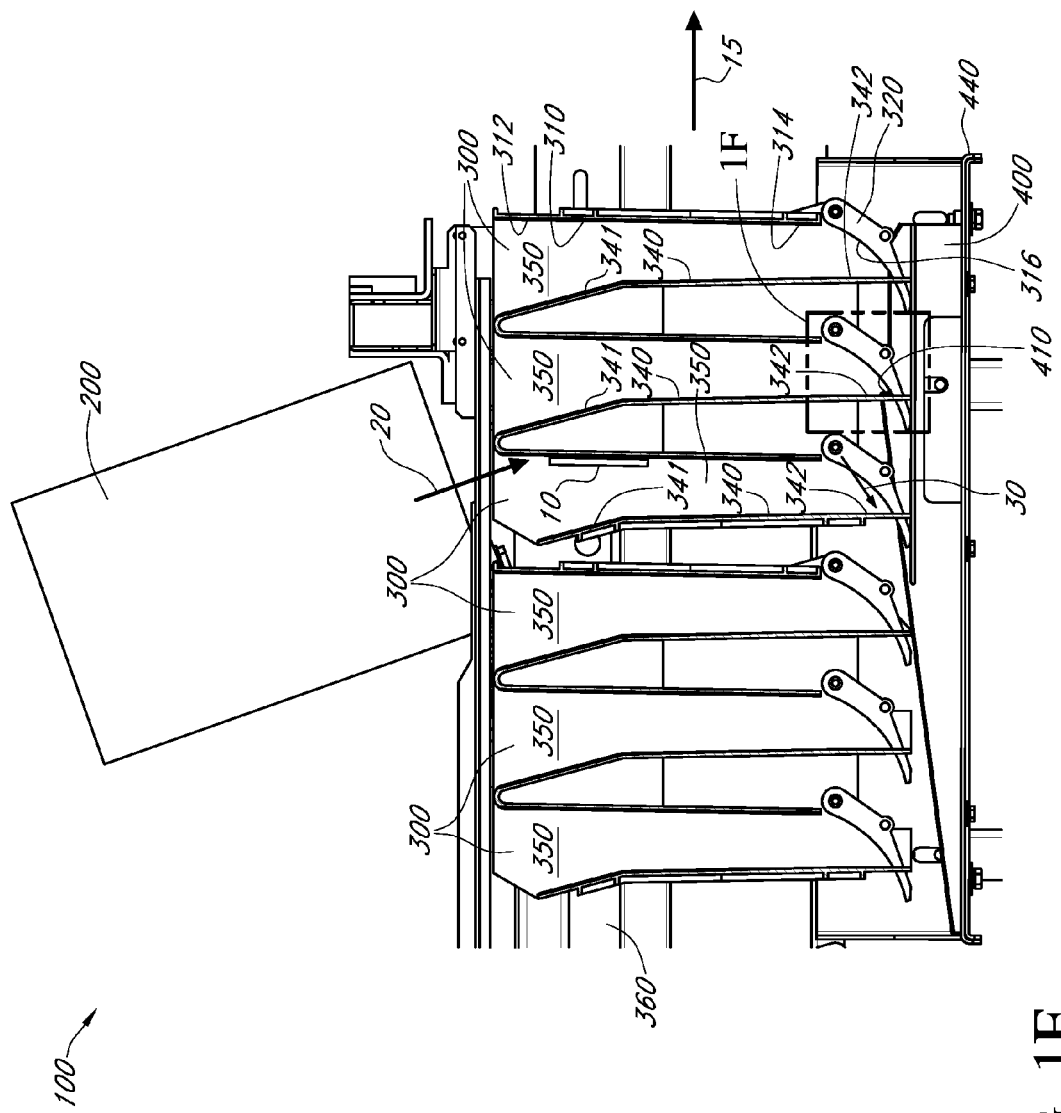

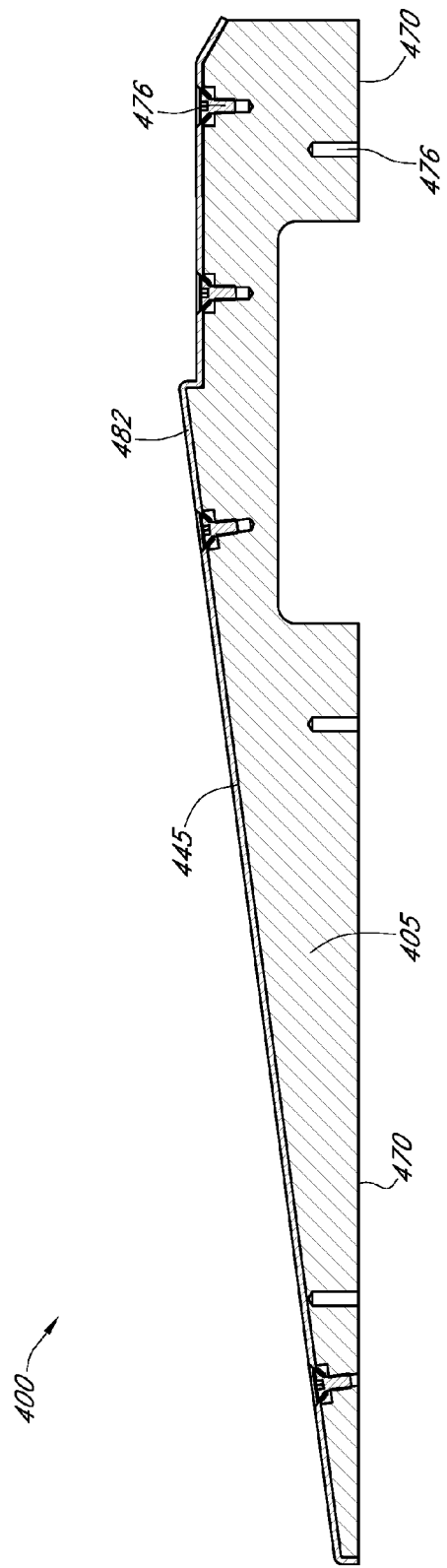

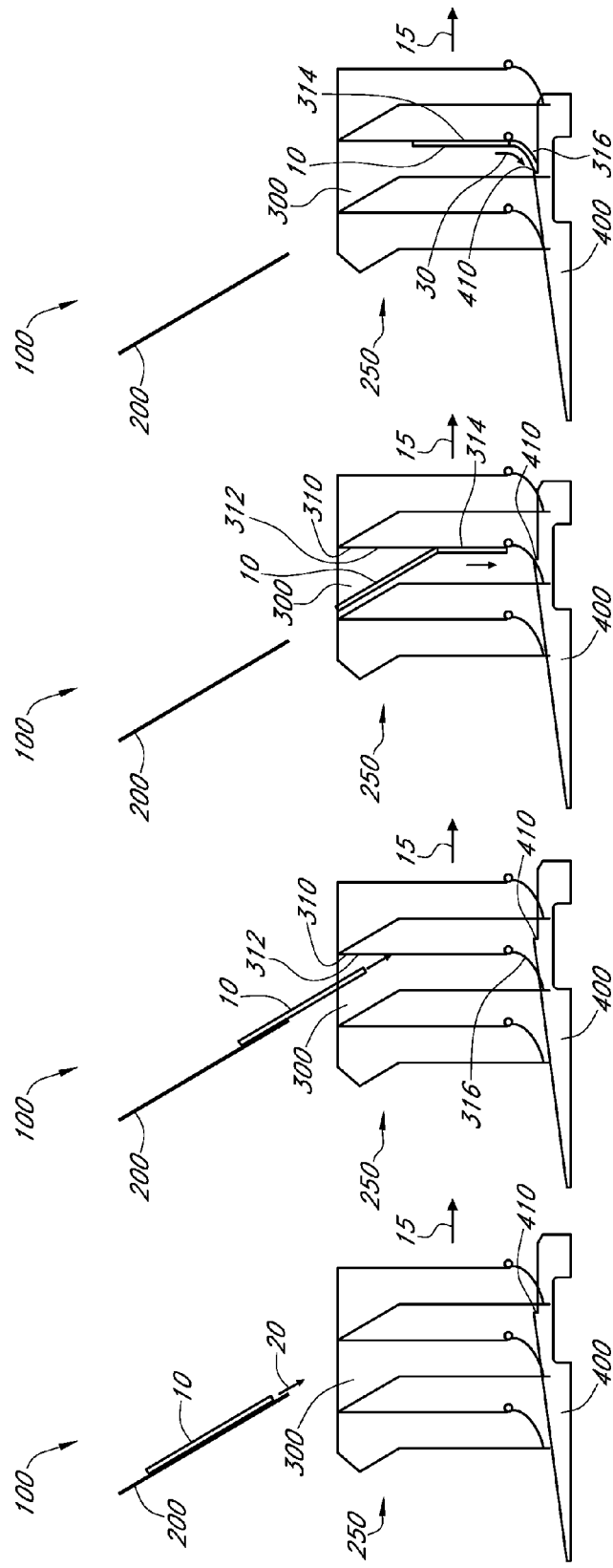

SYSTEMS, DEVICES AND METHODS FOR RECEIVING AN ITEM

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57. For example, this application is a continuation of U.S. application Ser. No. 15/357,869, filed on Nov. 21, 2016, and entitled "SYSTEMS, DEVICES AND METHODS FOR RECEIVING AN ITEM," which is a continuation of U.S. application Ser. No. 14/848,989, filed on Sep. 9, 2015, and entitled "SYSTEMS, DEVICES AND METHODS FOR RECEIVING AN ITEM," now issued U.S. Pat. No. 9,505,577, which claims the benefit of priority under 35 U.S.C. § 119(e) of U.S. Provisional Application No. 62/049,932, filed on Sep. 12, 2014, and entitled "SYSTEMS, DEVICES AND METHODS FOR RECEIVING AN ITEM," the entire disclosure of each of which is incorporated herein by reference in its entirety for all purposes and forms a part of this specification.

BACKGROUND

Field

This disclosure relates generally to item handling. In particular, systems, devices and methods for repeated receiving of items in a receptacle are disclosed.

Description of the Related Art

In many industrial concerns, efficient handling of large numbers of items is crucial. For example, many items must be received, sorted and/or delivered accurately and on time. Some operations involve thousands or millions of items handled daily. Typically, automated machines and/or assembly lines are used for the operations involved in handling the numerous items. Cyclic or repeated use of such machines can result in damaging wear and tear, such as cyclic stress or structural fatigue. For example, some automated processes involve sorting items into different physical receptacles. These receptacles may receive thousands of such items daily which impact the receptacles upon being received. Over time, the multiple impacts from receiving such items in the receptacles cause stresses that continually weaken and may eventually fracture or break the receptacles. Further, in high volume processes, the items and/or receptacles may be moving with high speed in order to efficiently process many such items. Higher speeds result in larger impact forces on the receptacle into which the items are received. These larger forces compound the problem of cyclic loading and can cause further damage to the system.

As another example, mail delivery operations may involve automated sorting and receiving of thousands of pieces of mail daily. The high frequency and high volume of mail items being received in sorting bins impose cyclic stresses on the bins. These stresses may fracture or break the bins, thereby requiring repair of costly components. Further, the downtime in repairing or replacing these components causes further financial loss and other harms to business operations.

This is merely one example of an industrial concern that relies on sorting and receiving high volume items. Others may include, but are not limited to, retail concerns with large inventories and high daily sales, high volume component manufacturers such as consumer goods, and importing concerns with high volume imports needing sorting and receiving daily.

There is therefore a need for improved systems, devices and methods that can handle repeatedly receiving a high volume of items without the aforementioned drawbacks.

SUMMARY

The embodiments disclosed herein each have several aspects no single one of which is solely responsible for the disclosure's desirable attributes. Without limiting the scope of this disclosure, its more prominent features will now be briefly discussed. After considering this discussion, and particularly after reading the section entitled "Detailed Description of Certain Embodiments," one will understand how the features of the embodiments described herein provide advantages over existing item receiving systems, devices and methods.

In a first aspect, a system for receiving an item is disclosed. The system may comprise a receptacle comprising a front side and a back side. The front and back sides may at least partially define a receiving space therebetween, with the receiving space configured to be positioned along an initial direction of travel of the item. The system may further comprise a guiding surface coupled with the front side at least partially defining the receiving space, with the guiding surface configured to guide the item to a final direction of travel that is different from the initial direction of travel. The system may further comprise at least one bumper separate from the receptacle and comprising an impact surface that intersects the final direction of travel, with the impact surface extending at least partially into the receiving space of the receptacle and configured to absorb an impact force of the item as the receptacle moves relative to the bumper.

In some embodiments, the impact surface is a projection of the bumper. The impact surface may also be a recess of the bumper. In some embodiments, the guiding surface may comprise a curvature.

In some embodiments, a bottom portion of the front side defines a first notch, a bottom portion of the back side defines a second notch, and the impact surface extends at least partially into the receiving space between the defined first and second notches. In some embodiments, the bumper is stationary and extends through the defined first and second notches. In some embodiments, the bottom portion of the front side is a gate coupled with the front side, and the gate comprises the guiding surface. In some embodiments, the bumper is stationary and extends through the defined first and second notches.

In some embodiments, the gate is pivotably coupled to the front side and is configured to pivot to a closed position in which the gate prevents the item from exiting the receptacle near the bottom portion of the back side and the gate is further configured to pivot to an open position in which the gate does not prevent the item from exiting the receptacle near the bottom portion of the back side.

In some embodiments, the system further comprises an injector configured to propel the item in the initial direction of travel. In some embodiments, a bottom portion of the front side defines a first notch, a bottom portion of the back side defines a second notch, and the impact surface extends at least partially into the receiving space between the defined first and second notches.

In some embodiments, the system further comprises a plurality of bumpers comprising a plurality of impact surfaces, with a bottom portion of the front side defining a plurality of first notches corresponding to the plurality of bumpers, a bottom portion of the back side defining a plurality of second notches corresponding to the plurality of bumpers and aligned with the plurality of defined first notches, and with each bumper of the plurality of bumpers occupying a respective portion of the receiving space between corresponding aligned first and second notches and thereby at least partially exposing each impact surface of the plurality of impact surfaces in the respective portion of the receiving space between the first and second plurality of defined notches. In some embodiments, each bumper of the plurality of bumpers is stationary and extends through corresponding aligned first and second notches. In some embodiments, the plurality of impact surfaces are on a plurality of projections of the plurality of bumpers. In some embodiments, the plurality of impact surfaces are a plurality of recesses of the plurality of bumpers.

In some embodiments, the system further comprises a plurality of receptacles comprising a plurality of guiding surfaces. In some embodiments, each bumper of the plurality of bumpers is stationary and extends through corresponding aligned first and second notches. In some embodiments, the plurality of impact surfaces are a plurality of projections of the plurality of bumpers. In some embodiments, the plurality of impact surfaces are a plurality of recesses of the plurality of bumpers. In some embodiments, the plurality of guiding surfaces comprises a plurality of curvatures. In some embodiments, the bottom portion of the front side of each receptacle of the plurality of receptacles is a gate coupled with the front side. Each gate may be pivotably coupled to the bottom portion of the front side of the corresponding receptacle and may be configured to pivot to a closed position in which each gate prevents the item from exiting the receptacle near the bottom portion of the corresponding back side and to pivot to an open position in which the gate does not prevent the item from exiting the receptacle near the bottom portion of the corresponding back side.

In another aspect, a method for receiving an item is disclosed. The method may comprise positioning a receptacle such that it intersects an initial direction of travel of the item, receiving the item in a receiving space of the receptacle, positioning an impact surface of a bumper such that it at least partially extends into the receiving space of the receptacle, wherein the bumper is separate from the receptacle, guiding the item with the receptacle along a final direction of travel that is different than the initial direction of travel and that intersects the impact surface of the bumper, and absorbing an impact force of the item with the impact surface as the receptacle moves relative to the bumper.

In some embodiments, positioning an impact surface comprises aligning the bumper with a notch defined by the receptacle. In some embodiments, positioning an impact surface comprises positioning a projection on the bumper. In some embodiments, guiding the item comprises guiding the item along a guiding surface. In some embodiments, the method further comprises propelling the item in the initial direction of travel.

In another aspect, a system for receiving an item is disclosed. The system may comprise means for positioning a receptacle such that it intersects an initial direction of travel of the item, means for receiving the item in a receiving space of the receptacle, means for positioning an impact surface of a bumper such that it at least partially extends into the receiving space of the receptacle, wherein the bumper is separate from the receptacle, means for guiding the item with the receptacle along a final direction of travel that is different than the initial direction of travel and that intersects the impact surface of the bumper, and means for absorbing an impact force of the item with the impact surface as the receptacle moves relative to the bumper.

In another aspect, a bumper for absorbing an impact force of an item is disclosed. The bumper may comprise an elongated member comprising a top and a bottom, a front end coupling a first end of the top to a first end of the bottom, a back end coupling a second end of the top to a second end of the bottom, the top comprising a front portion and a back portion, and an impact surface coupling the front portion to the back portion, wherein the impact surface is configured to absorb the impact of the item.

In some embodiments of the bumper, the impact surface is a projection. In some embodiments, the projection is vertical. In some embodiments, the top comprises a layer. In some embodiments, the member and the layer are formed from metallic materials. In some embodiments, the member is formed from aluminum and the layer is formed from steel. In some embodiments, the back portion is horizontal and the front portion of the top is angled with respect to the back portion. In some embodiments, the impact surface is a recess. In some embodiments, the recess comprises a vertical section.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through use of the accompanying drawings. In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

FIG. 1C depicts a front elevation view of the system of FIG. 1A.

FIG. 1E depicts a section view of the system of FIG. 1A taken along the line 1E-1E as indicated in FIG. 1C.

FIG. 2C depicts a sectional view of the bumper taken along the line 2C-2C in FIG. 2B.

FIGS. 4A-4D depict sequential side views of an embodiment of a moving receptacle receiving an item at sequential points in time.

DETAILED DESCRIPTION

The following detailed description is directed to certain specific embodiments of the development. In this description, reference is made to the drawings wherein like parts or steps may be designated with like numerals throughout for clarity. Reference in this specification to "one embodiment," "an embodiment," or "in some embodiments" means that a particular feature, structure, or characteristic described in connection with the embodiment is included in at least one embodiment of the invention. The appearances of the phrases "one embodiment," "an embodiment," or "in some embodiments" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but may not be requirements for other embodiments.

Embodiments of the development will now be described with reference to the accompanying figures, wherein like numerals refer to like elements throughout. The terminology used in the description presented herein is not intended to be interpreted in any limited or restrictive manner, simply because it is being utilized in conjunction with a detailed description of certain specific embodiments of the development. Furthermore, embodiments of the development may include several novel features, no single one of which is solely responsible for its desirable attributes or which is essential to practicing the invention described herein.

Systems, devices and methods for receiving an item received in a receptacle are disclosed. Features are disclosed for receiving and guiding the item in a receiving space of the receptacle so as to attenuate or remove the impact force of the item with the receptacle. Some embodiments of the disclosure include a bumper having an impact surface which absorbs the impact force of the item and thereby mitigates or removes the imposition of loads on the receptacle. The bumper may be physically de-coupled or otherwise physically separated from the receptacle such that an advantageous division of labor may be created between absorbing the impact and receiving the item. The receptacle may be allowed to move at a high speed so that a high volume of items may be processed or otherwise handled by the system. This disclosure may be useful, for example, in modern industrial operations where a high volume of items are received daily, such as in mail sorting operations.

Figure 1A:
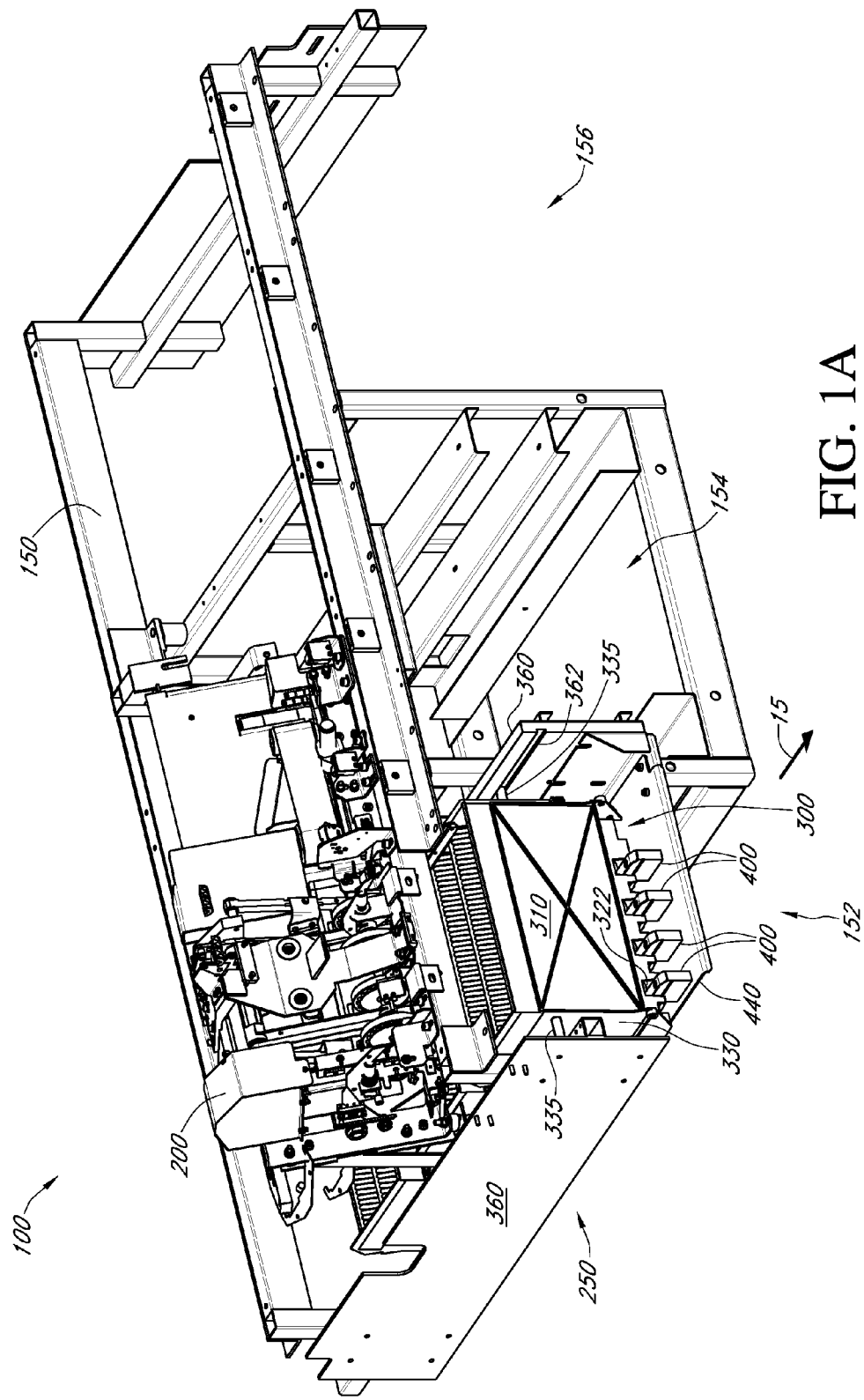
FIG. 1A depicts a perspective view of an embodiment of a system for receiving an item in a receptacle, including a support structure, an injector, a track, receptacles, bumpers and a base.

Turning to FIG. 1A, a perspective view of an embodiment of a system 100 for receiving an item 10 (not shown) in one of a plurality of receptacles 300 is shown. The system 100 may be used in many different contexts. The system 100 is suited for operations with handling of items 10. The system 100 is also suited for handling high volumes of items 10. For example, the system 100 may be used in an automated operation where many items 10 are handled. An embodiment of the system 100 may be in a delivery item handling operation, such as a postal service. For instance, many thousands or millions of pieces of mail may need to be sorted and received in receptacles 300. Thus, mail handling is one application where the system 100 may be used. Other applications may use or benefit from the system 100.

Figure 1B:
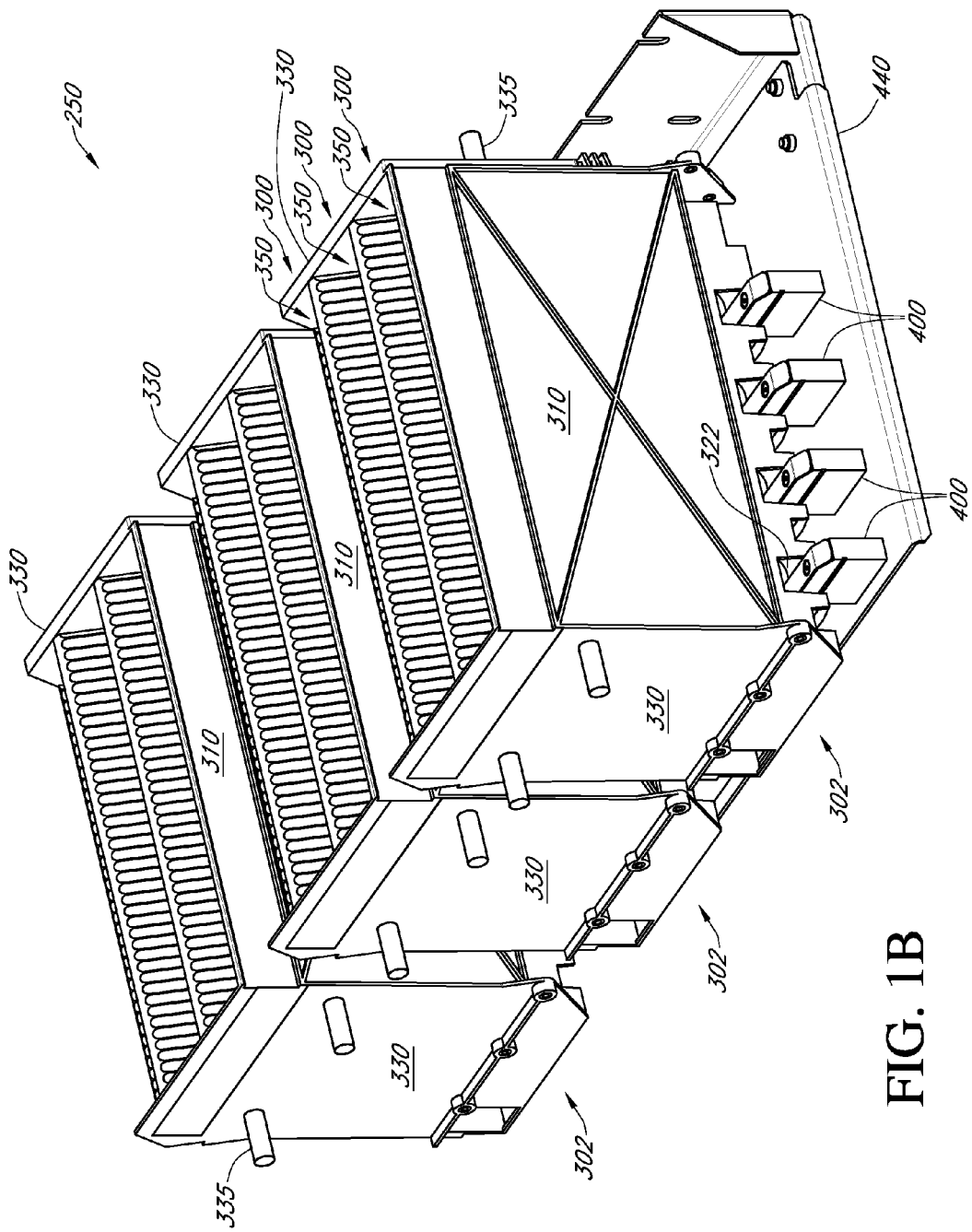
FIG. 1B depicts a perspective view of the receptacles, bumpers and base from the system of FIG. 1A.

As shown in FIG. 1A, the system 100 may include a support structure 150, an injector 200 and a receiving system 250. Portions of the receiving system 250 are depicted in FIG. 1B. The system 100 may be located in an item sorting and handling facility. The support structure 150 may be constructed from steel beams or other rigid structures that support the injector 200 and/or the receiving system 250. As shown, the support structure 150 is a rigid frame formed from mechanically attached steel beams and defines various sections. The structure 150 may include a first section 152, a second section 154 and a third section 156. The first section 152 may include the injector 200 and the receiving system 250. The second section 154 may include machinery or devices that initially provide the items 10 that will be handled, sorted, etc. by the injector 200 and received by the receiving system 250. People may also initially provide the items 10, for example by loading the items 10 in the injector 200. The third section 156 is shown empty but may include other features of the system 100, such as modules for an infeed line (not shown). The receiving system 250 in the first section 152 may be mounted to the support structure 150. The receiving system 250 may also be located on the ground, on a platform or on another secure mounting structure, for example a concrete slab. The injector 200 may be located on, above or otherwise positioned adjacent to the receiving system 250, for example on an upper beam of the structural support 150 mounted above the receiving system 250.

The injector 200 may be a machine or apparatus that propels or otherwise moves the item 10 toward one of a plurality of receptacles 300 of the receiving system 250. The injector 200 may comprise a container such as a bin or bag, for example, configured to store the items 10 to be sorted, handled, and/or otherwise processed. The injector 200 may send the item 10 moving through the space between the injector 200 and the receiving system 250. For example, the injector 200 may propel the item 10 through the air. In some embodiments, there is more than one injector 200. For example, there may be three (3) injectors 200 under which the receptacles 300 travel. Some of the receptacles 300 may receive items 10 from a first injector 200, other receptacles 300 may receive other items 10 from a second injector 200 (not shown), and still other receptacles 300 may receive other items 10 from a third injector 200 (not shown). In some embodiments, there are more or fewer than three (3) injectors 200.

The receiving system 250 may include the plurality of receptacles 300, a track 360, a plurality of bumpers 400, and a base 440. The track 360 may be an elongated, structural support, such as a wall, for guiding the plurality of receptacles 300. The track 360 may thus be a metal or other rigid material that guides the receptacles 300 as they move. The track 360 may include a single wall or multiple walls. The receptacles 300 may be moved by a chain (not shown) running along a groove 362 of the track 360 that is connected to and moved by a motor (not shown). A knob 335 on one or both the sides of the receptacles 300 may couple the receptacles 300 to the moving chain in the groove 362 of the track 360.

FIG. 1B shows the receptacles 300, the base 440 and the bumpers 400 of the receiving system 250 from FIG. 1A. Referring to FIGS. 1A and 1B, the receptacles 300 may move in the direction 15. The receptacles 300 may move in this direction 15 over the bumpers 400. In some embodiments, the bumpers 400 may be fixed relative to an inertial frame of reference and the receptacles 300 may be moving relative to that frame. For example, the receptacles 300 may be translating and the bumpers 400 may be stationary. In some embodiments, the receptacles 300 move with a speed of 0.6 meters per second (m/s). Other suitable speeds may be implemented.

As the receptacles 300 move over the bumpers 400, the bumpers 400 may partially occupy a receiving space 350 of the receptacles 300 through notches 322 in the lower portions of the receptacles 300. When the bumpers 400 are occupying the space within the receptacles 300, the injector 200 may inject the item 10 or multiple items 10 into one or more of the receptacles 300. The receptacles 300 may then receive the item 10 and the bumper 400 may absorb an impact force from the item 10. Each of the receptacles 300 may receive a different item 10. The receptacles 300 may then move away from the bumpers 400 in the direction 15 to an unloading site (not shown). At the unloading site, the receptacles 300 may then empty their respective items 10 for further sorting, delivery, handling, etc. The receptacles 300 may empty their respective items from the bottom of the receptacles 300 by opening a bottom portion of the receptacles 300.

In some embodiments, there are multiple receptacles 300. In some embodiments, there are ten, fifty, one hundred, several hundred, thousands or other amounts of receptacles 300. In embodiments with more than one receptacle 300, the receptacles 300 may be grouped into receptacle groups 302. For instance, the receptacles 300 as shown are grouped into three groups 302 of three receptacles 300 in each group 302. Each group 302 of three receptacles 300 may be mechanically coupled together by two side panels 330 on either side of the group 302. Other arrangements and group 302 sizes are possible. In some embodiments, there may be two hundred and fifty three (253) receptacles in the group 302. Therefore, the system 100 shown in FIGS. 1A and 1B may include more receptacles 300 than what is depicted. Further, any of the features and functionalities discussed herein with respect to a single receptacle 300 may apply to embodiments having multiple receptacles 300, and vice versa.

Each receptacle 300 may include a front side 310, at least one side panel 330, and a back side 340 (not shown). The front side 310, two side panels 330, and the back side 340 may be coupled together to form a partially closed, single receptacle 300. The top of the receptacle 300 may be open in order to receive the item 10 in a receiving space 350 of the receptacle 300. The bottom of the receptacle 300 may be closed off by a curvature in a lower portion of the front side 310, as discussed in further detail herein, for example with respect to FIG. 1D-1F. There may be multiple receptacles 300 grouped together, with each receptacle 300 having a front side 310 and a back side 340. The side panels 330 may close off the sides of the receptacles 300. For example, three receptacles 300 may be grouped together and closed off on the sides with a single side panel 330 on each side of the receptacles 300, as discussed in further detail herein, for example with respect to FIG. 1E. In some embodiments, there may be two hundred and fifty three (253) receptacles grouped together.

The front side 310 of the receptacle 300 may provide a front structure of the receptacle 300. The front side 310 of the receptacle 300 extends along the width and height along the front side of the receptacle 300. The front side 310 may be a substantially planar and generally rectangular panel, wall or other generally flat structure. The front side 310 may have a curvature near the bottom portion of the structure. As is discussed in further detail herein, for example FIGS. 1E-1G, the curvature of a bottom portion of the front side 310 may guide the item 10 toward the bumpers 400 that occupy a space inside the receptacle 300, as the receptacle 300 is moving over the bumpers 400. The front side 310 may be formed of any suitable material. For example, the front side 310 may be made from a plastic, polymer, metal, other rigid material, or combinations thereof. The front side 310 may have a thickness (shown in the cross section view of FIG. 1E). The thickness of the front side 310 may be about five (5) millimeters (mm). The thickness of the front side 310 may be thicker or thinner than five (5) millimeters (mm).

The back side 340 may be a structural side of the receptacle 300 that is located generally opposite from the front side 310. The back side 340 may extend along the width and height on a rear side of the receptacle 300. The back side 340 may extend substantially vertically from the bottom of the receptacle 300 and then turn at an angle toward the top (the vertical and angled portions are shown in the cross section view of FIG. 1E). The back side 340 may be formed from a metal, plastic or other rigid structure having a thickness. The thickness of the back side 340 may be about five (5) millimeters (mm). The thickness of the back side 340 may be thicker or thinner than about five (5) millimeters (mm). The back side 340 may be formed of the same or similar material or materials as the front side 310.

The side panels 330 may define one or more sides of the receptacle 300. There may be two side panels 330. The side panels 330 of the receptacle 300 couple the front side 310 of one of the receptacles 300 to the back side 340 of the same receptacle 300. Multiple receptacles 300 may be assembled together in a group 302 of receptacles 300 that is closed off on two lateral sides by two side panels 330. In some embodiments, multiple groups 302 of receptacles 300 may be assembled together and closed off on the sides by only two side panels 330 for the entire assembly of groups. The side panels 330 may be substantially planar panels, walls or other generally flat structures. They may have a contour or perimeter that complements the sides of the receptacles 300 with which they are coupled. For instance, an edge of the side panel 330 that couples with the front side 310 may be flat with a curvature near the bottom to complement and couple with the front side 310, and an edge of the side panel 330 that couples with the back side 340 may be vertical from the bottom and then angled to complement and couple with the contour of the back side 340. The side panels 330 may be formed of any suitable material. For example, the side panels 330 may be made from a plastic, polymer, metal, other rigid material, or combinations thereof. The side panels 330 may have a thickness. The thickness of the side panel 330 may be about five (5) millimeters (mm). The thickness of the side panel 330 may be thicker or thinner than about five (5) millimeters (mm).

The bumpers 400 may be located underneath the receptacles 300 and supported on a base 440. The base 440 may provide a generally planar platform for the bumpers 400 and/or other parts of the system 100. The base 440 may be a structural support located at or near the bottom of the receiving system 250. The base 440 may be a metal frame or other solid foundation, for example a metal platform on the ground in a sorting and handling facility. The plurality of bumpers 400 may sit on top of or otherwise be mounted to the base 440. In some embodiments, the base 440 provides a structure to couple to the bumpers 400. The bumpers 400 may be rigidly or fixedly attached to the base 440. In some embodiments, the bumpers 400 are supported on the base 440 in a fixed position. Attachments well known in the art may be used, such as bolts, fasteners, screws, adhesive, tape, other suitable attachments, or combinations thereof.

As shown, there may be four bumpers 400 (only partially shown) located underneath the injector 200 (shown in FIGS. 1A and 1C-1E). In some embodiments, there may be more or fewer bumpers 400. The bumpers 400 may be organized into clusters or groups alongside the track 360 with each group underneath an injector 200. For instance, a first group of four (4) bumpers 400 may be located underneath a first injector 200 (for instance, as shown in FIGS. 1A and 1C-1E), a second group (not shown) of four (4) bumpers 400 may be located underneath a second injector 200 (not shown), and a third group (not shown) of four (4) bumpers 400 may be located underneath a third injector 200 (not shown). The receptacles 300 may travel to the first group of bumpers 400, and then to the second and third groups along the track 360.

The bumpers 400 may have an elongated structure (the ends of which are partially shown in FIGS. 1A-1B). The direction along which the bumpers 400 are elongated may be aligned with the direction 15 of movement of the receptacles 300. The bumpers 400 may further extend through notches in the receptacles 300 in a manner that is more fully described herein. The bumpers 400 may include an impact surface 410 (not shown in FIGS. 1A-1D) that absorbs the impact of the item 10 within the receptacles 300 as the receptacles 300 move over the bumpers 400. In some embodiments, the bumpers 400 are metal, plastic, polymer, other materials, or combinations thereof. In some embodiments, the bumpers 400 are aluminum, steel, other metals, or combinations thereof. The bumpers 400 may be solid, hollow, or combinations thereof. Further details of the bumpers 400 are discussed herein, for example with respect to FIGS. 2A-2C

The bumpers 400 may thus absorb an impact force of the item 10 by providing a structure that occupies a lower part of the receiving space 350 of the receptacle 300 (see FIGS. 1E-1G)). The impact force of the item 10 is the reaction force of the structure with which the item 10 primarily collides. That is, the impact force is the force that is primarily responsible for bringing the item 10 to rest. Thus, while the item 10 may impart a force on some part of the receptacle 300, such as the front side 310, upon initially being received by the receptacle (see FIG. 1E), it is understood that this is different from the term "impact force" as used herein. Further, the impact force may be due to the momentum of the moving item 10. For example, the impact force may be approximately proportional to the mass of the item 10 and the velocity with which it is moving right before it collides with the bumper 400. The bumper 400 may act to intercept the item 10 as the item 10 moves and thus bear the brunt of the impact force. This may reduce, mitigate, or completely remove an impact force on the receptacle 300 from the item 10. For instance, the bumper 400 may reduce or prevent the impact force from the item 10 on the back side 340 of the receptacle 300 (see FIG. 1E). The bumper 400 may also reduce or prevent the impact force from the item 10 on other portions of the receptacle 300. The bumper 400 may also reduce or prevent the impact force from the item 10 on other parts of the system 100. Absorption of the impact force of the item 10 by the impact surfaces 410 of the bumpers 400 is discussed in further detail herein, for example with respect to FIGS. 1E-1G and 4A-4D.

Turning to FIG. 1C, a partial front view of the system 100 is shown. As shown, the front side 310 of the receptacle 300 is visible. A width and height of the front side 310 is visible, where, as oriented, the width in the lateral or horizontal direction is larger than the height in the vertical direction. The front side 310 may thus have a generally rectangular planform or shape as viewed from the front. Other configurations are possible, such as square, elongated, round, oval, others, or combinations thereof.

The receptacle 300 may include a gate 320. In some embodiments, the front side 310 may be coupled with the gate 320 at or near the bottom portion 314 of the front side 310. By "coupled" it is meant that the components are mechanically linked together, either directly linked together, or indirectly linked to each other by intervening links, as is discussed in further detail herein, for example with respect to FIGS. 1F-1G. The gate 320 may be a separate part from the front side 310. The gate 320 may be an elongated and rigid structure along the width of the receptacle 300 that prevents the items 10 from falling out of the bottom of the receptacle 300. The gate 320 may be formed of any suitable material. For example, the gate 320 may be made from a plastic, polymer, metal, other rigid material, or combinations thereof. The gate 320 may have a tapering thickness (see FIG. 1E). The thickness may taper from about half an inch (0.5") to a quarter of an inch (0.25"). The thicknesses may be thicker or thinner. The gate 320 may be rotatably coupled at one end to the front side 310, as discussed in further detail herein, for example with respect to FIGS. 1E-1G.

The receptacle 300 may define a first notch 322. The first notch 322 may be a space or cutout defined by edges and/or surfaces of the receptacle 300 at or near a lower part of the receptacle 300. Thus the first notch 322 may be defined by a structure or feature of the receptacle 300. As shown, the first notch 322 is a cutout of the gate 320 of the receptacle 300. In some embodiments, the first notch 322 is a cutout of the front side 310. For example, in some embodiments without a gate 320, the first notch 322 may be at a lower part of the front side 310. In some embodiments, the first notch 322 is a cutout of a lower part of the front side 310.

As shown, there may be multiple first notches 322 defined along the width of the gate 320. In some embodiments, the first notches 322 may be along the width of the front side 310. As shown, there are four first notches 322. The first notch or notches 322 may be at least partially defined by segments 324 of the gate 320. The segments 324 are those parts of the receiving system 250, such as the gate 320 as shown, on either side of the first notch or notches 322. In some embodiments, there are four first notches 322 in the receptacle partially defined by five segments 324. As shown, the front side 310 is coupled with the gate 320 which contains four first notches 322 and five segments 324. The first notches 322 are shown with a generally rectangular shape. Other shapes are possible, such as square, rounded, curved, oval, elliptical, others, or combinations thereof. The segments 324 are shown with a generally rectangular shape. Other shapes are possible, such as square, rounded, curved, oval, elliptical, others, or combinations thereof. Further, different segments 324 of the same receptacle 300 may have different shapes and/or sizes. Thus, the segments 324 need not all have the same geometry. As shown and as oriented in FIG. 1B, the segment 324 near the middle of the width of the gate 320 has a different geometry than the segment 324 on the right side of the gate 320.

Further shown in FIG. 1C are front views of the bumpers 400. As shown, the system 100 includes four bumpers 400. However, the system may include more or fewer bumpers 400. The bumpers 400 may be spaced so as to absorb the impact force of the item 10 (not shown in FIG. 1C) no matter where in the receptacle 300 the item 10 is received. For instance, as oriented in FIG. 1C, the left or right sides of the receptacle 300 may initially receive the item 10 and one or more of the bumpers 400 in those respective locations may absorb the corresponding impact force from the item 10. The bumpers 400 may be evenly spaced along the width of the receptacle 300. The bumpers 400 may also be arranged or configured in other suitable configurations, such as unevenly spaced.

The multiple bumpers 400 may be aligned. As shown, the bumpers 400 are aligned and are generally parallel to one another. Thus, the bumpers 400 may have an elongated shape (see FIGS. 2A-2C) where the bumpers 400 are aligned in a direction along the elongated dimension. In some embodiments, the bumpers 400 are aligned in the direction along which the receptacle 300 moves. For example, the receptacles 300 may be moving out of the plane of FIG. 1B such that the receptacles 300 move over the aligned bumpers 400.

As shown, the bumpers 400 may be aligned with the first notches 322. For instance, there may be four first notches 322 in the receptacle 300 with which the four bumpers 400 may be respectively aligned. Thus, a single bumper 400 may be aligned with a single first notch 322. Other configurations are possible. For instance, there may be multiple bumpers 400 aligned with a single first notch 322, where the first notch 322 may be wide enough to span the multiple bumpers 400. Some first notches 322 may not be aligned with a bumper 400. For instance, the injector 200 may be calibrated to propel items 10 only along a center portion of the receptacle 300, in which the outer most bumpers 400 may not be present.

Figure 1D:
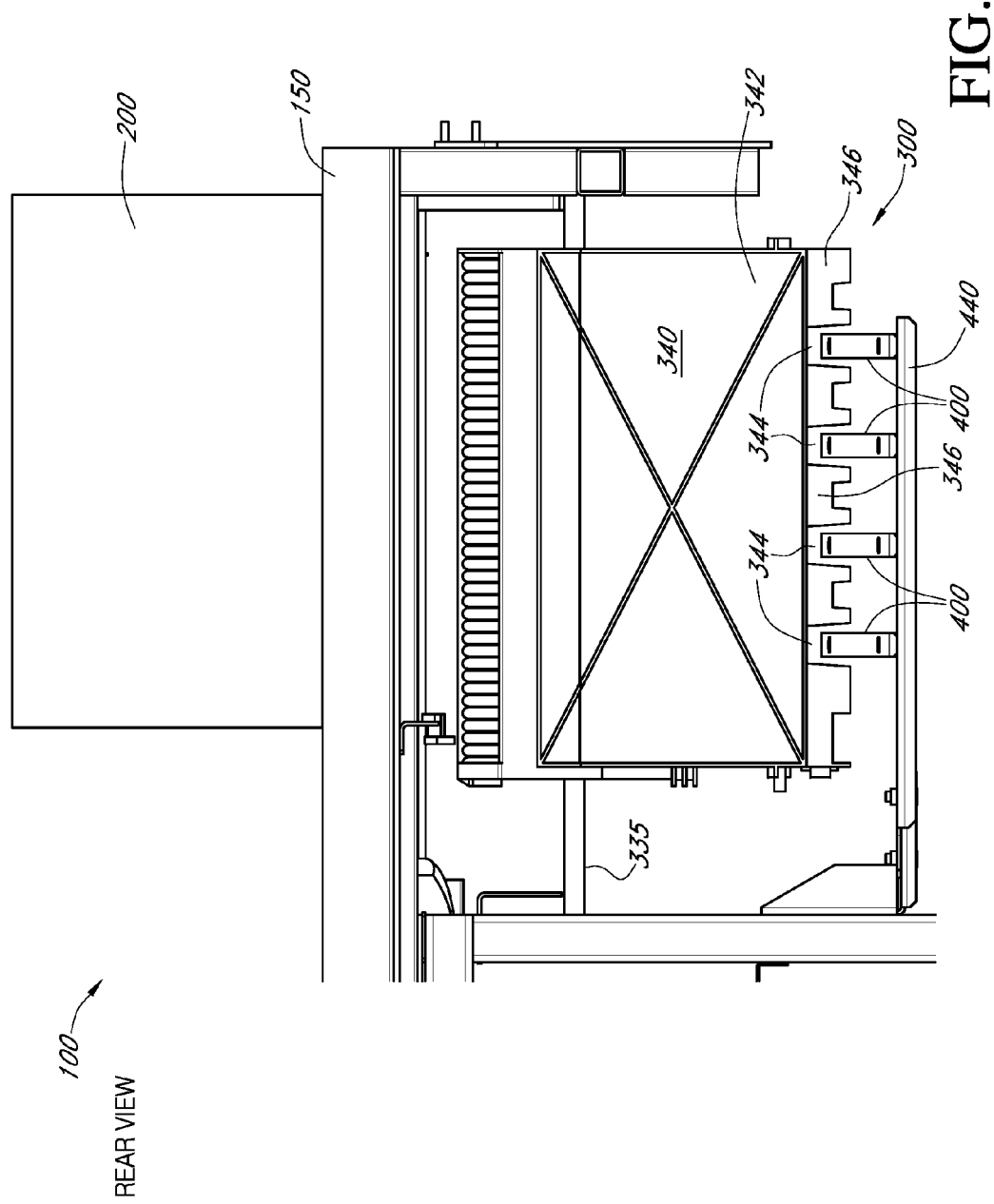
FIG. 1D depicts a rear elevation view of the system of FIG. 1A.

FIG. 1D depicts a partial rear view of the system 100. As shown, the back side 340 of the receptacle 300 is visible. A width and height of the back side 340 is visible. The back side 340 may have any or all of the features and/or functionalities as discussed herein with respect to the front side 310. For instance, the back side 340 may have a generally rectangular planform. As shown, the back side 340 extends along the width of the receptacle 300.

The receptacle 300 may define a second notch 344. The second notch 344 may be a space or cutout defined by edges and/or surfaces of the receptacle 300 at or near a lower part of the receptacle 300. The second notch 344 may have any or all of the features and/or functionalities as discussed herein with respect to the first notch 322. Thus the second notch 344 may be defined by the structure of the receptacle 300. In some embodiments, the second notch 344 is a cutout of the back side 340. In some embodiments, the second notch 344 is a cutout at or near a bottom portion 342 of the back side 340. As shown, the bottom portion 342 is a portion of the back side 340 that is at or near the bottom of the back side 340. In some embodiments, the bottom portion 342 is a separate part that is coupled with the back side 340. For instance, this may allow for easy repair and or replacement of if the bottom portion 342 is damaged—instead of having to repair or replace the entire back side 340, only the bottom portion 342 may need to be repaired or replaced.

The receptacle 300 may define multiple second notches 344 along the width of the back side 340. As shown, the receptacle 300 defines four second notches 344. The second notch or notches 344 may be at least partially defined by segments 346. The segments 346 are extensions of the receptacle 300 side that define the sides of the second notch or notches 344. In some embodiments, there are five segments 346 that define four second notches 344 in the receptacle 300. The segments 346 may define second notches 344 that have a generally rectangular shape. Other shapes are possible, such as square, rounded, curved, oval, elliptical, others, or combinations thereof. The segments 346 are shown with a generally rectangular shape. Other shapes are possible, such as square, rounded, curved, oval, elliptical, others, or combinations thereof. Further, different segments 346 of the same receptacle 300 may have different shapes and/or sizes.

The second notch or notches 344 defined by the receptacle 300 as shown in FIG. 1D may align with the first notch or notches 322 defined by the receptacle 300 as shown in FIG. 1C. In some embodiments, the second notches 344 of the back side 340 may align with the first notches 322 of the front side 310. There may be four second notches 344 that each align with a respective first notch 322. In some embodiments, this alignment is along the direction 15 (see FIGS. 1A-1B) of movement of the receptacle 300. Thus, for example, the receptacle 300 may be moving into the plane of the figure in FIG. 1C, which shows the first notches 322 aligned with the second notches 344 in a direction that is perpendicular to this plane, i.e. in a direction that is parallel with the direction 15 of movement of the receptacle 300. "Alignment" as used herein with respect to the first and second notches 322, 344 does not necessarily mean that corresponding first and second notches 322, 344 are the same size or shape. All that is required is that some portion of the first notch 322 overlaps with some portion of the corresponding second notch 344 along an aligned direction. For instance, if the notches are aligned along the direction 15 of movement of the receptacle 300, then along this direction at least some portion of the first notch 322 overlaps with at least some portion of the corresponding (aligned) second notch 344.

The system 100 may include multiple bumpers 400 aligned with the first notch 322 and the second notch 344. Thus, each pair of first notches 322 and second notches 344 that are aligned may also have one or more of the bumpers 400 aligned in between the two notches. Therefore, there may be multiple sets of aligned notches 322, 344 with an aligned bumper 400 in between the aligned notches 322, 344. In some embodiments, the gate 320 of the front side 310 comprises a plurality of first notches 322 corresponding to the plurality of bumpers 400, i.e. there may be the same quantity of bumpers 400 as the quantity of first notches 322, and the plurality of first notches 322 may be aligned with the plurality of second notches 344, with each bumper 400 occupying a respective portion of the interior of the receptacles 300 between corresponding aligned first and second notches 322, 344. In this manner, each bumper 400 may be at least partially exposed in a portion of the interior of the receptacles 300 between the first and second plurality of notches 322, 344. As shown in FIGS. 1C-1D, there are four sets of bumpers and notches, where each set has the first notch 322, the second notch 344 and the bumper 400 all aligned with respect to each other.

Referring to FIG. 1E, a section view of the system 100 is shown as taken along line 1E-1E as indicated in FIG. 1C. FIG. 1E shows the receptacles 300 in section view so that the interiors of the receptacles 300 are visible. Therefore, FIG. 1E depicts cross sections of the front sides 310 and back sides 340 of the receptacles 300.

Each front side 310 of the receptacles 300 may be generally flat with a thickness. The thickness may be substantially uniform along a height of the front side 310. The front side 310 may include a top portion 312 near the top of the interior of the front side 310. The top portion 312 refers to an area of the front side 310 that is generally on the upper, interior surface of the front side 310. The front side 310 may also include a bottom portion 314 near the bottom of the interior of the front side 310. The bottom portion 314 refers to an area of the front side 310 that is generally on the lower, interior surface of the front side 310.

Cross sections of the back sides 340 of the receptacles 300 are shown in FIG. 1E. The back side 340 may have a contour that includes a substantially vertical lower portion 342 and an angled upper portion 341. The thickness of the back side 340 may be substantially uniform along this contour of the back side 340.

As shown, the receptacles 300 may share a common structural member. That is, the back side 340 of a receptacle 300 may be formed from the same, continuous structure as the front side 310 of an adjacent receptacle 300. As oriented in FIG. 1E, the first and second receptacles 300 from the right share a structural member as do the second and third receptacles 300. For instance, as oriented in FIG. 1E the back side 340 of the first receptacle 300 on the right shares a structural member with the front side 310 of the receptacle 300 that is second from the right. Similarly, as oriented in FIG. 1E, the back side 340 of the second receptacle from the right shares a common structural member with the front side 310 of the receptacle 300 that is third from the right. However, the back side 340 of the third receptacle 100 from the right does not share a structure with another receptacle to the left. This is because the receptacles 300 are grouped together in groups of three, as mentioned. In some embodiments, the receptacles 300 may be in groups with more or fewer receptacles 300. This configuration of sharing a common structural member allows for a more efficient use of materials and assembly time. In some embodiments, the receptacles 300 may each be formed from separate structures.

As shown, the gate 320 may have a guiding surface 316. The guiding surface 316 may be a surface of the gate 320 that faces the interior of the receptacle 300. The guiding surface 316 may redirect, steer or otherwise guide the injected item 10 as the item 10 moves over the guiding surface 316. The guiding surface 316 may guide the item 10 from the front side 310 and toward and/or into a final direction of travel 30, as discussed in further detail below.

As shown, the guiding surface 316 forms a curvature as viewed transversely. In some embodiments, the guiding surface 316 forms a curvature that is rounded. The surface 316 is shown as generally rounded or circular. However, other shapes or contours are possible. The surface 316 may form a curvature that is a radial curve, such as with a circle, or it may form other curves, such as elliptical, oval, other rounded contours, and/or combinations thereof. The surface 316 may also include straight or flat segments. In some embodiments, the surface 316 may form a curvature that is curved, straight, segmented, other shapes, and/or combinations thereof. Further, the surface 316 may form a curvature that comprises flat segments. For example, the surface 316 may be comprised of multiple, short flat segments. In some embodiments, the surface 316 may be a combination of rounded and flat segments. In some embodiments, the surface 316 may be entirely or mostly straight.

An impact surface 410 of the bumper 400 is further shown in FIG. 1E. The impact surface 410 may be a surface or other feature of the bumper 400 that absorbs the impact force of the item 10. In this context, by "absorb" it is meant that the impact force is imparted to the impact surface 410 from the moving item 10 and that the impact surface 410 is primarily responsible for bringing the item to rest within the receptacle 300. Further details of the "impact force" are described herein, for example with respect to FIGS. 1A-1B. In some embodiments, the impact surface 410 extends at least partially into the receiving space 350 of the receptacle 300. In some embodiments, the impact surface 410 is configured to absorb the impact force of the item 10 inside the receiving space 350. In some embodiments, the impact surface 410 is positioned such that it intersects the final direction of travel 30 of the item 10. Thus, the impact surface 410 may absorb most or all of the impact force from the moving item 10.

Each receptacle 300 may define a receiving space 350 on the interior of the receptacle 300. The receiving space 350 refers to the pocket or cavity inside the receptacle 300 that receives the item 10. The receiving space 350 is thus defined or formed by the structure around its perimeter or boundary. As shown in FIG. 1E, the front side 310 may define a portion of this boundary of the receiving space 350. This portion of the boundary of the receiving space 350 extends from the top portion 312 of the front side 310 to the bottom portion 314 of the front side 310. This part of the receiving space 350 may thus be generally flat.

Continuing along the interior of the receptacle in a clockwise direction, another part of the boundary of the receiving space 350 may be defined by the gate 320. Thus the guiding surface 316 of the gate 320, which faces the interior of the receptacle 300, may define another part of the boundary of the receiving space 350. This part of the receiving space 350 may thus be curved, due to the curvature of the guiding surface 316 of the gate 320.

Continuing in a clockwise direction, another part of the boundary of the receiving space 350 may be defined by the interior of the back side 340. This portion of the boundary of the receiving space extends from a lower area of the interior of the back side 340 to an upper area of the interior of the back side 340. This part of the receiving space 350 may thus be angled.

Continuing in a clockwise direction, another part of the boundary of the receiving space 350 may be defined by the uppermost edges of the back side 340 and front side 310. As mentioned, the receptacles 300 are open at the top so that the item 10 may be received by the receptacle through the top. Thus, the upper boundary of the receiving space 350 is defined by a plane that contacts both the top portions of the front and back sides. It is understood that this plane is merely a geometric construct for explanation and clarity, and that it is not a physical part of the system 100.

The receiving space 350 further includes the interior space within the boundary just described. The receiving space 350 may include the space where the item 10 is initially received within the receptacle 300, such as near the top of the receptacle 300 as illustrated. The receiving space 350 may include any other space where the item 10 travels within the receptacle 300, such as near the bottom of the receptacle 300 as illustrated. The receiving space 350 may be defined at least in part by the space that is in between the front side 310 and the back side 340. As illustrated, this is the upper area of the receptacle 300 between the front side 310 and the back side 340. The receiving space 350 may also include the area where the item 10 comes to rest within the receptacle 300. As illustrated, this is the lower area of the receptacle 300 between the front side 310 and the back side 340. The receiving space 350 may also include any areas within the receptacle 300 in between these upper and lower areas.

The receptacle 300 may be positioned so as to receive the item 10 in the receiving space 350. For example, as mentioned the receptacles 300 may be moved along the track 360 by the motor and chain (not shown). In some embodiments, the timing of the movement of the receptacles is coordinated with the timing of the injection of the items 10 from the injector 200 such that the bumpers 400 extend into the receiving space 350 when the item is received in the receiving space 350.

Other scenarios with relative motion are possible as well. For instance, both the bumper 400 and receptacle 300 may be moving but at different velocities or speeds such that there is relative motion between the bumper 400 and receptacle 300. In some embodiments, the receptacle 300 translates relatively quickly from left to right as illustrated while the bumper 400 may move relatively more slowly. In some embodiments, the receptacle 300 translates from left to right as illustrated while the bumper 400 may move slightly to absorb the impact force of the item 10. For example, the bumper 400 may be mounted on elastic shock absorbers, such as springs (not shown), to further attenuate the impact force of the item 10. Thus, the receptacle 300 may translate while the bumper 400 rebounds slightly from the impact force. Further, the receptacle 300 and/or bumper 400 may move in more than one dimension. For example, the bumper 400 may be mounted on springs in such a manner to allow for vibratory motion in two dimensions, such as horizontally and vertically.

Positioning the receptacle 300 so as to receive the item 10 in the receiving space 350 may include positioning the receptacle 300 such that the receiving space 250 is intersected by an initial direction of travel 20 of the item 10. The initial direction of travel 20 of the item 10 may be the initial direction that the item 10 is travelling or otherwise moving. The initial direction of travel 20 may be a linear direction, such as a line. It may also be curved, linear, other shapes, or combinations thereof. In some embodiments, the injector 200 may propel the item 10 along the initial direction of travel 20. For example, the injector may emit the item 10 such that the item 10 is propelled through the air along a generally linear and/or slightly curved initial direction of travel 20.

The initial direction of travel 20 may be angled with respect to the front side 310 of the receptacle 300. As shown, the initial direction of travel 20 is slightly angled with respect to the front side 310. In some embodiments, the front side 310 is generally vertical while the initial direction of travel 20 is less than forty five degrees (45°) off the vertical. Other angles may be used, and this is merely one example.

The item 10 may travel along the initial direction of travel 20 and contact the receptacle 300 at the top portion 312 of the front side 310. The item 10 may initially contact the top portion 312 when received by the receptacle 300. In some embodiments, the item 10 may initially contact other portions or areas of the receptacle 300.

The item 10 may also contact a bottom portion 314 of the receptacle 300. The item 10 may initially contact the top portion 312 and then slide down or otherwise travel or move to the bottom portion 314.

The item 10 may then be guided along or otherwise by the guiding surface 316 toward and/or into a final direction of travel 30. In some embodiments, the guiding surface 316 may guide the item 10 from the front side 310 and toward and/or into the final direction of travel 30. The final direction of travel 30 is the direction of travel of the item 10 upon impact with the bumper 400 inside the receiving space 350. It is therefore understood that the final direction of travel 30 as used herein may not necessarily refer to the last or final direction along which the item 10 may move. For instance, the item 10 may impact the bumper 400 and rebound in another direction. The final direction of travel 30 may be a linear direction such as a line, a curved direction, other direction, or combinations thereof. The final direction of travel 30 may further be in a different direction than the initial direction of travel 20. As shown, there are roughly 80 degrees (80°) between the final direction of travel 30 and the initial direction of travel 20. In some embodiments, there may be sixty degrees (60°), seventy degrees (70°), ninety degrees (90°) or other angular amounts between the final direction of travel 30 and the initial direction of travel 20. These are merely examples, and the final direction of travel 30 may be at many other angles with respect to the initial direction of travel 20.

In some embodiments, as the item 10 is travelling along the final direction of travel 30, the item 10 is intercepted by the impact surface 410 of the bumper 400 which absorbs the impact force of the moving item 10. The system 100 may thus include the impact surface 410 of the bumper 400 extending into the receiving space 350 between the notches. Thus, the impact surface 410 may occupy the receiving space between the first notch 322 and the second notch 344 of the receptacles 300. The impact surface 410 may be positioned so as to absorb the impact force of the item 10. The impact surface 410 may be positioned so as to absorb the impact force of the item 10 after the item 10 is guided by the guiding surface 316 into the final direction of travel 30.

In some embodiments, there is relative movement between the receptacle 300 and the bumper 400 and the item 10 impacts the impact surface 410 when the impact surface 410 is aligned with and in between the first and second notches 322, 344 (shown in FIGS. 1C-1D). In some embodiments, the receptacles 300 are moving and the item 10 impacts the impact surface 410 when the impact surface 410 is between the first and second notches 322, 344. In some embodiments, the receptacles 300 are moving, the bumpers 400 are stationary and the item 10 impacts the impact surface 410 when the impact surface 410 is between the first and second notches 322, 344. In some embodiments, the receptacles 300 are moving and the injector 200 propels the item 10 into the receptacle 300 such that the item 10 impacts the impact surface 410 when the impact surface 410 is between the first and second notches 322, 344. Therefore, the movement of the item 10 and/or the receptacle 300 may be timed or otherwise coordinated so that the item 10 impacts the impact surface 410.

Figure 1G:
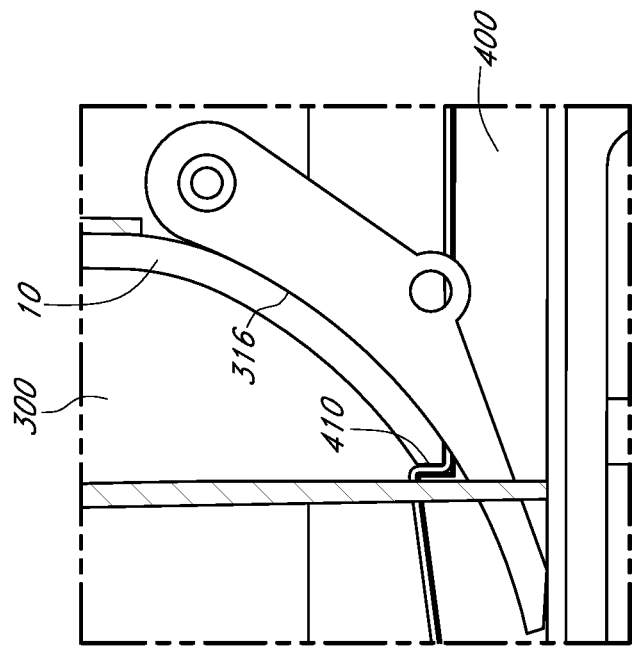
FIG. 1G depicts the detail view of FIG. 1F with the addition of a received item impacting the impact surface.
Figure 1F:
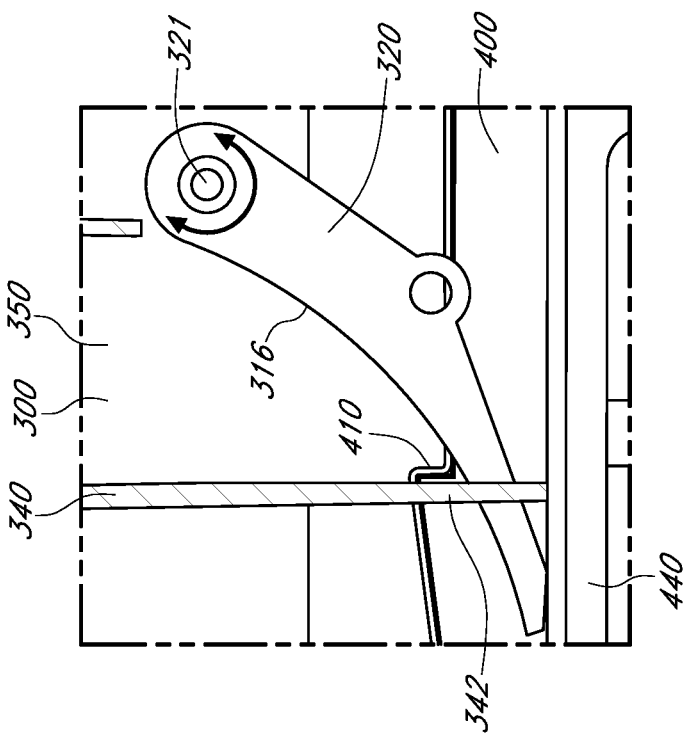
FIG. 1F depicts a detail view from the system of FIG. 1E and designated as 1F, showing an impact surface of a bumper extending into a receiving space of the receptacle.

FIG. 1F depicts a detail view of a lower portion of the receiving system 250. The detail view of FIG. 1F is taken from the section view of FIG. 1E as indicated by the dashed detail box in FIG. 1E. As shown in FIG. 1F, the impact surface 410 of the bumper 400 is in the receiving space 350 in between the gate 320 and the back side 340. As mentioned, the gate 320 may merely be a lower part of the front side 310. The gate 320 may therefore be the bottom portion 314 of the front side 310.

As depicted, the gate 320 is coupled with the bottom portion 314 of the front side 310. By "coupled" it is meant that the components are mechanically linked together, either directly linked to each other, or indirectly linked to each other by intervening links. As shown, the gate 320 is coupled with the front side 310 by a pin 321. The pin 321 may be an elongated rod that couples with the gate 320 and the front side 310. In some embodiments, the gate 320 is coupled with the front side 310 by other mechanical means, such as bolts, shear pins, hinges, or other structural members. These are merely examples and other suitable features may be used.

In some embodiments, the gate 320 may be pivotably or rotatably coupled to the front side 310. In some embodiments, the gate 320 may be pivotably coupled to the front side 310 by the pin 321. The pivotable coupling allows the gate 320 to pivot or otherwise rotate. In some embodiments, the gate 320 may be pivotably coupled to the front side 310 by the pin 321 and thereby be pivotable about the pin 321. The gate 320 may pivot to a closed position. In the closed position, the gate 320 may prevent the item 10 from exiting the receptacle 300 near the bottom portion 342 of the back side 340. The gate 320 is shown in a closed position in FIGS. 1F and 1G. The gate 320 may also pivot to one or more open positions. In the open position, the gate 320 may not prevent the item 10 from exiting the receptacle 300 near the bottom portion 342 of the back side 340. In some embodiments, the gate 320 may pivot counterclockwise, as oriented in FIGS. 1F and 1G, to the open position.

The gate 320 may be in a closed position while the receptacle is receiving the item 10. After the receptacle has received the item 10, then the gate 320 may be opened at an unloading site to allow the item 10 to exit the receptacle. For example, the receptacle 300 may receive the item 10 from the injector 200, and the item 10 may be guided by the front side 310 and the guiding surface 316 of the gate 320 to impact the impact surface 410. The gate 320 may then contain the item 10 inside the receptacle 300 such that the item 10 does not fall out of or otherwise exit the receptacle 300. The receptacle 300 may then move to another location of the facility, such as the unloading site, where the item 10 is to be dropped into a bin for further sorting, delivery, etc. At this point, the gate 320 may move to an open position to allow the item 10 to drop or otherwise exit the receptacle 300. In some embodiments, the gate 320 may rotate or otherwise pivot to this open position.

FIG. 1G depicts the detail view of FIG. 1F with the addition of a received item 10. The item 10 may be a piece of mail. In some embodiments, the item 10 is a piece of flat mail, a package, a magazine or any other item that may be handled, sorted, and/or received.

The item 10 is shown impacting the impact surface 410 of the bumper 400. In some embodiments, the bumper 400 is separate from the receptacle 300, thus separating the functions of absorbing the impact force and receiving the item 10. In other words, the bumper 400 may absorb the impact force while the receptacle 300 receives and then transports the item 10. In this manner, the receptacle 300 is not subject to repeated loadings from a high volume of items 10 being received by the receptacle 300. This division of labor has a cascading effect in terms of improved efficiency and less required time and cost of the system 100. For instance, the receptacle 300 thus need not be structurally reinforced because it is not bearing the brunt of the impact force. This allows the receptacle 300 to be lighter, saving material and manufacturing costs, and thus requiring less power to move the lighter receptacle 300, further saving costs. Further, the receptacles 300 will be damaged less often and will last longer, which reduces the frequency of downtime where a receptacle 300 must be removed from the system 100 for repairing or replacing. These are just some of the advantages of the system 100.

The item 10 may impact a single impact surface 410 on a single bumper 400. For example, a smaller item 10 may only impact a single impact surface 410. In some embodiments, an item 10 may impact multiple impact surfaces 410 on multiple bumpers 400. For example, a larger item 10 such as an elongated piece of mail may impact multiple impact surfaces 410.

Figure 2A:
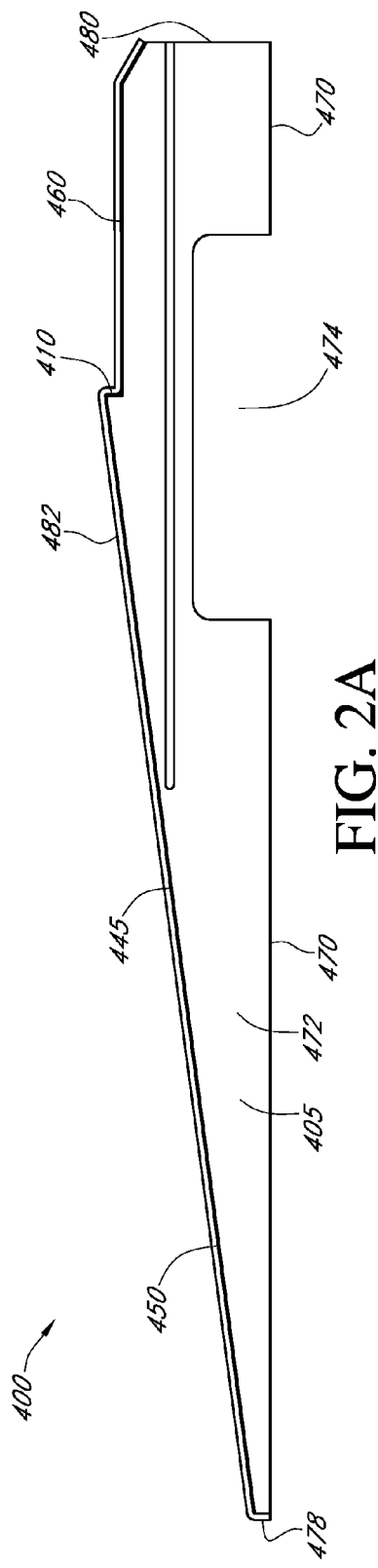
FIG. 2A depicts a side elevation view of an embodiment of a bumper that may be used with the system of FIG. 1A.
Figure 2B:
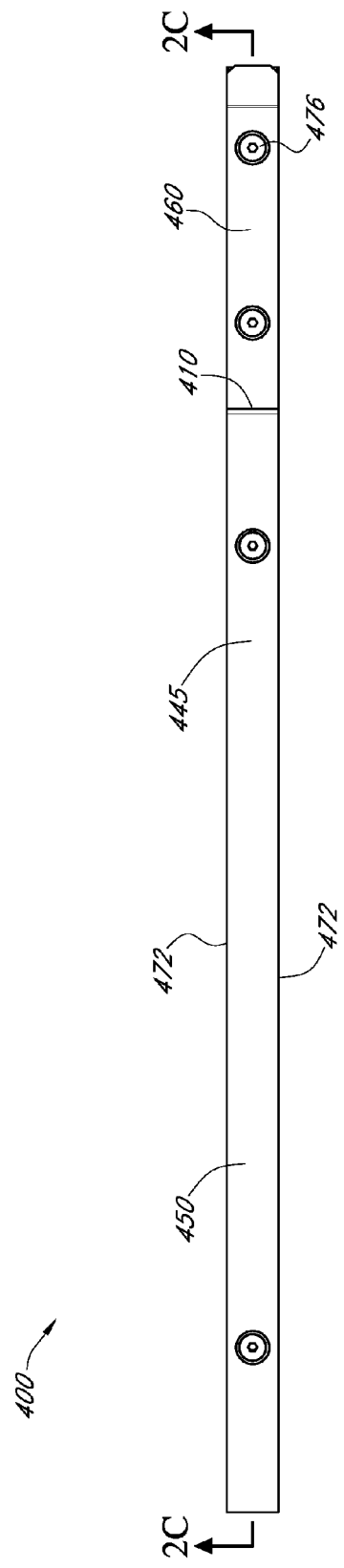
FIG. 2B depicts a top plan view of the bumper of FIG. 2A.

FIGS. 2A-2C depict various views of various embodiments of the bumper 400. As shown in FIG. 2A, a side view of an embodiment of a bumper 400 that may be used with the system 100 is depicted. As shown, the bumper 400 may include a member 405. The member 405 may be the main material from which some, most of, or the entire bumper 400 is made. In some embodiments, the member 405 is plastic, metal, other materials, or combinations thereof. In some embodiments, the member 405 is aluminum, steel, other metals, or combinations thereof. The member 405 may be solid, hollow, or combinations thereof.

The bumper 400 may include a top 445. The top 445 refers to the side or sides of the bumper 400 that generally face the receptacle 300 when configured in the system 100. The top 445 may include a front portion 450. As shown, the front portion 450 may be sloped or angled. The front portion 450 may be angled to ensure that receptacles 300 that already have items 10 inside them before they reach the bumpers 400 can pass smoothly over the bumpers 400. For example, in some embodiments, the system 100 has multiple injectors 200 with multiple sets of bumpers 400. Thus, a first injector 200 may inject an item 10 into the receptacle 300, which may then travel over another set of bumpers 400 located further down the track 360. The angled front portion 450 of the bumper 400 located further down the track 360 facilitates a smooth movement of the item 10 inside the receptacle 300 over the bumper 400. The top 445 may include a back portion 460. As shown, the back portion 460 may be flat. The top 445 may include the impact surface 410. As shown, the impact surface 410 may be in between the front and back portions 450, 460. The impact surface 410 may also be on a front end (i.e. on the left, as oriented in FIG. 2A) of the back portion 460. The impact surface 410 may be a generally vertical surface. In some embodiments, the impact surface 410 may be angled. For instance, the impact surface 410 may be angled so as to be perpendicular to a non-horizontal final direction of travel 30 of the item 10. Other suitable configurations and orientations of the impact surface 410 are possible and are discussed herein, for example with respect to FIGS. 3A-3C.

The bumper 400 may include a layer 482. The layer 482 may be on portions of the bumper 400. The layer 482 may cover the entire top 445 of the bumper 400 or portions thereof. As shown, the layer 482 covers the front end 478, the front portion 450, the impact surface 410 and the back portion 460. The layer 482 may have a thickness. The bumper 400 shown has a relatively thin layer 482 with respect to the overall height of the bumper 400, but other thicknesses may be implemented. In some embodiments, the layer 482 is made from sheet metal. The layer 482 may be stainless steel sheet metal. In some embodiments, the member 405 is made from aluminum and the layer is made from stainless steel sheet metal. The layer 482 may be a protective layer. The layer 482 may help with absorbing the impact of the item 10. The layer 482 may cover the impact surface 410. In some embodiments, the layer 482 supplements the impact surface 410 by providing an extra layer with which to absorb the impact force of the item 10. In some embodiments, the layer 482 provides the impact surface 410.

The bumper 400 may also include a bottom 470. The bottom 470 may include a cutout 474. The bumper 400 may also include a side 472. The side 472 may couple the top 445 to the bottom 470. In some embodiments, the bumper 400 has two sides 472, which are opposite each other. (Both sides 472 are shown in FIG. 2B.) As further shown in FIG. 2A, the bumper 400 may have a front end 478. The front end 478 may couple the top 445 to the bottom 470. The bumper 400 may have a back end 480. The back end 480 may couple the top 445 to the bottom 470.

FIG. 2B depicts a top view of the bumper 400 of FIG. 2A. As shown in FIG. 2B, the bumper 400 has a generally rectangular planform. However, the bumper may have other suitable shapes, such as triangular, trapezoidal, others, or combinations thereof. The two sides 472 are shown as opposite each other.

FIG. 2C depicts a section view of the bumper 400 as taken along line 2C-2C as shown in FIG. 2B. As shown in FIG. 2C, the bottom 474 may include holes 476. The holes 476 may be along the bottom 470. The holes 476 may be used to attach the bumper 400 to the base 440 (see FIGS. 1A-1C). The holes 476 may be bolt holes or other fastening features to couple the bumper 400 to the base 440. The holes 476 may be along the top 445. The holes 476 may be used to attach the layer 482 to the bumper 400. As depicted in FIG. 2C, the holes 476 along the top 445 are shown with fasteners that are attaching the layer 482, while the holes 476 along the bottom 470 are not shown with fasteners.

Figure 3C:
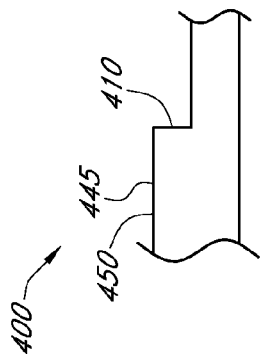
FIGS. 3A-3C depict side views of various embodiments of an impact surface that may be used with the bumpers of FIGS. 2A-2C.
Figure 3B:
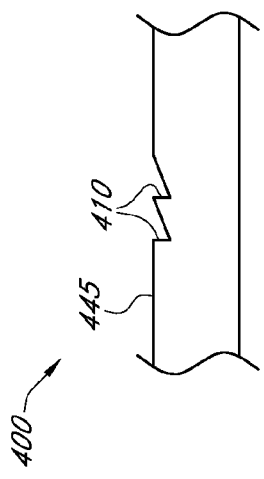
Figure 3A:
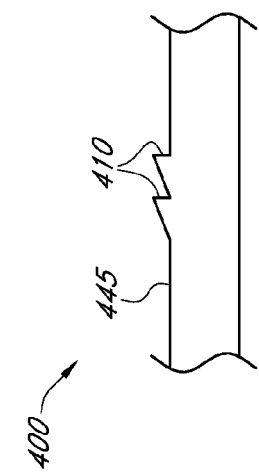

FIGS. 3A-3B depict side views of schematics of a portion of various embodiments of the bumper 400 that may be used with the system of FIG. 1A. The portions of the bumper 400 shown in FIGS. 3A-3B depict various embodiments of the impact surface 410 and adjacent portions of the top 445. For clarity, the bumpers 400 are shown without the layer 482.

As shown in FIG. 3A, the impact surface 410 may be a projection. The impact surface 410 may project from the top 445 of the bumper 400. As shown, the impact surface 410 is triangular in shape and extends upward from other surfaces of the top 445. In some embodiments, there may only be a single projection impact surface 410. In other embodiments, as shown, there may be multiple projection impact surfaces 410. Having multiple impact surfaces may facilitate the item 10 (not shown) impacting the impact surface 410 when the receptacle 300 (not shown) is in the right position. For instance, if the item 10 does not impact the right-most impact surface 410 as illustrated, then the item 10 may impact the left-most impact surface 410, or vice versa. By having a triangular shape of the impact surface 410, multiple such projection type impact surfaces 410 may be implemented close together, further increasing the likelihood of successful impact with the item 10 and loosening timing requirements of the system 100. The projection type impact surface 410 may be triangular or any other suitable shape, such as rectangular, square, pentagonal, other shapes, or combinations thereof. In some embodiments, more than two projection type impact surfaces 410 may be implemented, such as three, four or more.

As shown in FIG. 3B, the impact surface 410 may be a recess. The impact surface 410 may extend into the top 445 of the bumper 400. As shown, the impact surface 410 is triangular in shape and extends inward from the top 445. In some embodiments, there may only be a single recess impact surface 410. In other embodiments, as shown, there may be multiple recess impact surfaces 410. Having multiple impact surfaces may facilitate the item 10 (not shown) impacting the impact surface 410 when the receptacle 300 (not shown) is in the right position, as mentioned above with respect to FIG. 3A. The recess impact surface 410 may be triangular or any other suitable shape, such as rectangular, square, pentagonal, other shapes, or combinations thereof. In some embodiments, more than two recess type impact surfaces 410 may be implemented, such as three, four or more.

As shown in FIG. 3C, the impact surface 410 may be a flat step. This configuration may be similar to that shown in FIGS. 2A-2C, with the exception that the front portion 450 is flat. Other configurations of the bumper 400 with a flat step impact surface 410 may be implemented, and this is merely one example.

FIGS. 4A-4D depict side views at sequential points in time of an embodiment of a receptacle 300 receiving an item 10. Chronologically, the figures are in order of earliest to latest in time from FIG. 4A to FIG. 4D. As shown, the injector 200 and bumper 400 are stationary. While only one bumper 400 is shown, there may be multiple bumpers 400. For instance, other bumpers 400 may be behind the bumper 400 that is visible. Further, while only one receptacle 300 in the group of three receptacles 300 is shown receiving an item 10, this is merely for clarity. In some embodiments, adjacent receptacles 300 may all receive different items 10. There may also be more or fewer receptacles, for example nine (9) receptacles 300 as shown and discussed with respect of FIGS. 1A-1B. In some embodiments, there are two hundred and fifty three (253) receptacles 300.

As shown in FIG. 4A, the injector 200 contains the item 10. The injector 200 is beginning to propel the item 10. In some embodiments, the item 10 is beginning to move along the initial direction of travel 20. The item 10 may thus be propelled by the injector 200 along the initial direction of travel 20. Further, the receptacle 300 is shown moving from left to right as illustrated relative to the stationary injector 200 and bumper 400. Thus, the initial direction of travel 20 is shown initially intersecting the right-most receptacle as illustrated.

As shown in FIG. 4B, the injector 200 is emitting and propelling the item 10. The item 10 is travelling along the initial direction of travel 20. In some embodiments, the item 10 is propelled at a speed of approximately 3.4 meters per second (m/s). Further, the receptacle 300 has moved to the right relative to the position shown in FIG. 4A. In some embodiments, the receptacle 300 moves at a speed of approximately 0.6 m/s. Thus, the initial direction of travel 20 is now intersecting a top portion 312 of the front side 310 of the middle receptacle 300 as illustrated. The item 10 may thus travel toward the top portion 312 of this front side 310. Further, the initial direction of travel 20 may be at a slight angle with the front side 310. This results in a small force with the front side 310, as most of the force component is parallel to the front side 310. Thus a shear or sliding force, such as a friction force, may be imparted along the surface of the front side 310 as opposed to a normal force on the front side 310. This arrangement results in less damage to the receptacle 300 because the shear stresses or friction forces imparted to the front side 310 are less damaging than a normal force, the latter of which may tend to bend the front side 310. The sliding of the item 10 along the front side 310 also positions the item 10 to be guided by the guiding surface 316 of the receptacle 300.

As shown in FIG. 4C, the item has contacted the middle receptacle 300. The receptacle 300 has now moved to the right relative to the position shown in FIG. 4B. The item 10 is now beginning to slide down the front side 310. Thus, the item initially contacts the front side 310. The item 310 may also initially contact the top portion 312, the bottom portion 314, or other portions therebetween of the front side 310. For example, as shown, the item 10 is initially contacting the front side 310 at about the middle of the front side 310. The item 10 may bend upon contacting the front side 310. For example a flexible piece of mail may contact the front side 310 and bend in order to slide down the front side 310. The item 10 is shown bent and sliding toward the bottom portion 314 of the front side 310.

As shown in FIG. 4D, the receptacle 300 has moved to the right relative to the position shown in FIG. 4C. The item 10 is sliding over the guiding surface 316 of the bottom portion 314, which is guiding the item 10 to a final direction of travel 30. The item 10 is also impacting the impact surface 410 which is intersected by the final direction of travel 30. The item 10 is thus impacting the bumper 400, which is absorbing the impact force from the item 10.

As mentioned, the de-coupling of the bumper 400 and receptacle 300 structurally and functionally creates many advantages. With FIGS. 4A-4D, the relative motion of the various components of the system 100 in an embodiment is apparent. The receptacle 300 is moving toward the right as illustrated. The item 10 is received by the receptacle 300 and is guided or re-directed by the guiding surface 316 of the bottom portion 314 generally to the left as illustrated. Thus, in some embodiments, the item 10 eventually is moving in the opposite direction as the receptacle 300. Therefore, if the item 10 were to impact the receptacle 300 as opposed to the impact surface 410, the force would be additive. That is, the speed of the receptacle 300 travelling to the right and the final speed of the item 10 travelling to the left would result in a larger effective impact force, due to the opposing directions of travel. For example, if the receptacle 300 is moving to the right at about 3.4 m/s and the item 10 is moving at about 0.6 m/s to the left along a horizontal final direction of travel 30, then the total effective speed of the item 10 at impact would be about 4.0 m/s.

In contrast, with the stationary bumper 400, this additive effect on the speed is negated. Because the bumper 400 is stationary, there is no other component of force added, as would be the case if the item 10 impacted the moving receptacle. For example, if the item 10 is propelled at 3.4 m/s, then the effective speed of the item 10 is now merely the propelled speed of the item 10, or 3.4 m/s. Thus, not only is the impact force removed from the receptacle 300, but the amount of the impact force on the impact surface 410 is reduced. This further results in less force imparted to the bumper 400, resulting in longer-lasting bumpers 400. It also results in less force on the item 10, resulting in fewer damaged items 10. And, as mentioned, the receptacles 300 are subject to less force, if any at all, from the final impact of the item 10. All of these advantages and others result in a more robust system 100 that requires less maintenance, less repair, and less downtime, thus saving time and money over the life of the system 100 and facilitating more profitable operations.

Figure 5:
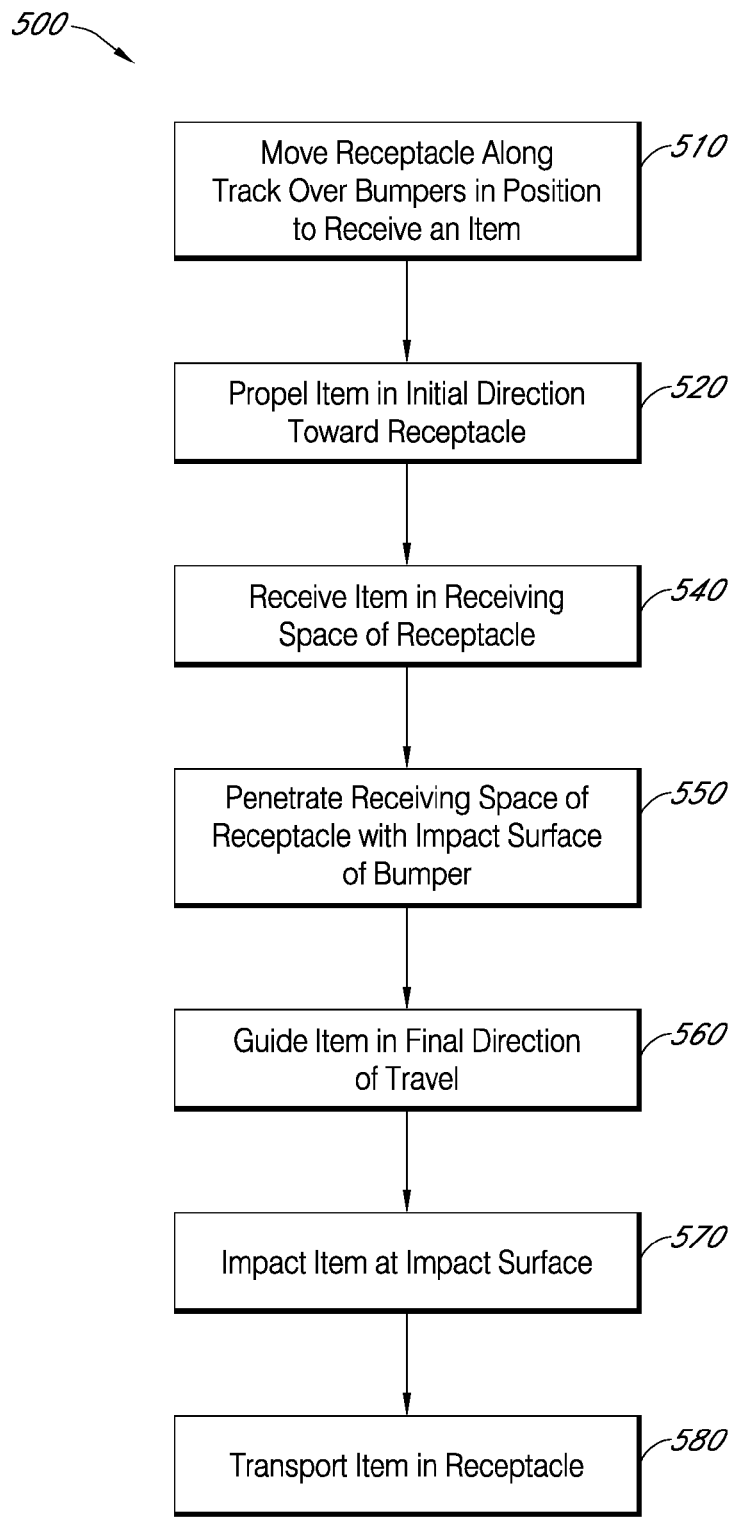
FIG. 5 depicts a flow chart of an embodiment of a method for receiving an item in a receptacle.

FIG. 5 depicts a flow chart of an embodiment of a method 500 for receiving an item in a receptacle. This may include the item 10 and the receptacle or receptacles 300 in the system 100. The method 500 may include block 510 wherein the receptacle is moved along a track to a position over a bumper and where the receptacle can receive an item. This may include moving the receptacle 300. It may include moving the receptacle 300 along the track 360 by use of a motorized chain coupled with the receptacles 300. It may include moving the receptacle 300 so that the receiving space 350 intersects the initial direction of travel 20 of the item 10.

The method 500 may further include block 520 wherein an item is propelled in an initial direction toward the receptacle. This may include propelling the item 10 with the injector 200 along the initial direction of travel 20 toward the receptacle 300. It may further include propelling the item 10 once the receptacle is over the bumpers 400. Block 520 may further include timing the propulsion of the item 10 such that the item will eventually impact the impact surface 410 of the bumper 400 inside the receiving space 350 of the receptacle 300.

The method 500 may further include block 540 wherein the item is received in the receiving space of the receptacle. This may include receiving the item 10 in the receiving space 350 of the receptacle 300. It may also include sliding the item 10 down a front side 310 of the receptacle 300. For instance, block 540 may include sliding the item from the top portion 312 of the front side 310 to the bottom portion 314. In some embodiments, the receptacle 300 may be moving while the item 10 is moving within the receiving space 350 of the receptacle 300.

The method 500 may further include block 550 wherein an impact surface penetrates the receiving space of the receptacle. This may include the impact surface 410 of the bumper 400 at least partially penetrating the receiving space 350 of the receptacle 300. Block 550 may include further moving the receptacle 300 along the bumper 400 such that the impact surface 410 of the bumper 400 extends into the receiving space 350. It may further include positioning the impact surface 410 such that it will intersect the final direction of travel 30 of the item 10 inside the receptacle.

The method 500 may further include block 560 wherein the item is guided in a final direction. This may include guiding the item 10 with the guiding surface 316 of the gate 320 toward the final direction of travel 30. In some embodiments, block 560 may include guiding the item 10 with a curved bottom portion 314 of the front side 310 toward the final direction of travel 30. Block 560 may include guiding the item 10 along a curved, straight, or other surface en route to the final direction of travel 30. The receptacle 300 may be moving in block 560 while the item 10 is guided to the final direction of travel 30 inside the receptacle 300.

The method 500 may further include block 570 wherein the item impacts the impact surface. This may include impacting the item 10 on the impact surface 410 of the bumper 400. Block 570 may include the item 10 impacting the impact surface 410 while the impact surface 410 is extending at least partially into the receiving space 350. The receptacle 300 may be moving while the item 10 impacts the impact surface 410 in block 570.

The method 500 may further include block 580 wherein the item is transported in the receptacle. This may include transporting the item 10 inside the receptacle 300 which is moving along the track 360. Block 580 may include transporting the item 10 in the receptacle 300 to an unloading site where the item 10 will be unloaded or otherwise removed from the receptacle 300. In some embodiments, block 580 includes opening the bottom of the receptacle 300 to allow the item 10 to fall out. For example, block 580 may include rotating the gate 320 to an open position to allow the item 10 to fall into a sorting bin.

The flow chart sequences are illustrative only. A person of skill in the art will understand that the steps, decisions, and processes embodied in the flowcharts described herein may be performed in an order other than that described herein.

Thus, the particular flowcharts and descriptions are not intended to limit the associated processes to being performed in the specific order described.

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. As will be recognized, the present invention may be embodied within a form that does not provide all of the features and benefits set forth herein, as some features may be used or practiced separately from others. The scope of the invention is indicated by the appended claims rather than by the foregoing description. All changes which come within the meaning and range of equivalency of the claims are to be embraced within their scope.

The foregoing description details certain embodiments of the systems, devices, and methods disclosed herein. It will be appreciated, however, that no matter how detailed the foregoing appears in text, the systems, devices, and methods may be practiced in many ways. As is also stated above, it should be noted that the use of particular terminology when describing certain features or aspects of the invention should not be taken to imply that the terminology is being redefined herein to be restricted to including any specific characteristics of the features or aspects of the technology with which that terminology is associated.

It will be appreciated by those skilled in the art that various modifications and changes may be made without departing from the scope of the described technology. Such modifications and changes are intended to fall within the scope of the embodiments. It will also be appreciated by those of skill in the art that parts included in one embodiment are interchangeable with other embodiments; one or more parts from a depicted embodiment may be included with other depicted embodiments in any combination. For example, any of the various components described herein and/or depicted in the Figures may be combined, interchanged or excluded from other embodiments.

With respect to the use of substantially any plural and/or singular terms herein, those having skill in the art may translate from the plural to the singular and/or from the singular to the plural as is appropriate to the context and/or application. The various singular/plural permutations may be expressly set forth herein for sake of clarity.

It will be understood by those within the art that, in general, terms used herein are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

All references cited herein are incorporated herein by reference in their entirety. To the extent publications and patents or patent applications incorporated by reference contradict the disclosure contained in the specification, the specification is intended to supersede and/or take precedence over any such contradictory material.

The term "comprising" as used herein is synonymous with "including," "containing," or "characterized by," and is inclusive or open-ended and does not exclude additional, unrecited elements or method steps.

All numbers expressing quantities of ingredients, reaction conditions, and so forth used in the specification and claims are to be understood as being modified in all instances by the term "about." Accordingly, unless indicated to the contrary, the numerical parameters set forth in the specification and attached claims are approximations that may vary depending upon the desired properties sought to be obtained by the present invention. At the very least, and not as an attempt to limit the application of the doctrine of equivalents to the scope of the claims, each numerical parameter should be construed in light of the number of significant digits and ordinary rounding approaches.

The above description discloses several methods and materials of the present invention. This invention is susceptible to modifications in the methods and materials, as well as alterations in the fabrication methods and equipment. Such modifications will become apparent to those skilled in the art from a consideration of this disclosure or practice of the invention disclosed herein. Consequently, it is not intended that this invention be limited to the specific embodiments disclosed herein, but that it cover all modifications and alternatives coming within the true scope and spirit of the invention as embodied in the attached claims.

What is claimed is:

1. A system for receiving an item, the system comprising:
a moveable receptacle comprising a front side and a back side, the front side and the back side at least partially defining a receiving space therebetween for receiving the item;
an injector disposed above the moveable receptacle, the injector configured to inject the item into the receiving space of the moveable receptacle;
a fixed surface below the moveable receptacle, the fixed surface comprising a bumper, the bumper comprising an impact surface on a top of the bumper, the impact surface being configured to absorb an impact force of the received item;
wherein the moveable receptacle is positionable over the impact surface such that the received item impacts the impact surface.

2. The system of claim 1, wherein the top of the bumper defines a first length and the distance between the front side and the back side of the moveable receptacle defines a second length, the first length being greater than the second length.

3. The system of claim 1, wherein the front side comprises a first notch, the back side comprises a second notch, and the bumper comprises an elongate body configured to extend into and between the first notch and the second notch.

4. The system of claim 1, wherein the fixed surface further comprises a second bumper, the second bumper comprising a second impact surface on a top of the second bumper, the second impact surface being aligned with the impact surface of the bumper and configured to absorb the impact force of the received item together with the impact surface of the bumper.

5. The system of claim 1, wherein the fixed surface further comprises a second bumper, the second bumper comprising a second impact surface on a top of the second bumper, the second impact surface being configured to absorb an impact force of a second received item.

6. The system of claim 1, wherein the bumper comprises an elongated body extending along a length from a front end to a back end and wherein the moveable receptacle moves in a first direction aligned with the length of the elongated body.

7. The system of claim 1, further comprising a second moveable receptacle comprising a front side and a back side, the front side and the back side of the second removable receptacle at least partially defining a second receiving space therebetween for receiving a second item, wherein the second moveable receptacle is joined to the moveable receptacle such that the moveable receptacle and second moveable receptacle are moveable together.

8. The system of claim 7, wherein the back side of the moveable receptacle is joined to the front side of the second moveable receptacle.

9. The system of claim 1, wherein the injector injects the item in a first direction and an upper portion of the back side of the receptacle comprises an angled surface which extends upward in a direction substantially opposite the first direction.

10. The system of claim 1, wherein the moveable receptacle comprises a gate on a bottom portion of the moveable receptacle, the gate being configured to open to allow the received item to exit the moveable receptacle after the received item impacts the impact surface.

11. A method for receiving an item, the method comprising:
continuously moving a receptacle comprising a front side and a back side in a first direction over a stationary bumper, the stationary bumper comprising an impact surface;
injecting the item into the receiving space of the receptacle; and
impacting the item such that an impact force of the received item is absorbed by the impact surface of the stationary bumper,
wherein the continuous movement of the receptacle and the injection of the item are coordinated such that the impact surface is positioned between the front side and the back side of the receptacle during the impact of the received item.

12. The method of claim 11, further comprising moving the item within the receiving space after impacting the item.

13. The method of claim 12, further comprising unloading the item from a bottom portion of the receptacle.

14. The method of claim 13, wherein unloading the received item comprises rotating a gate on a bottom portion of the receptacle.

15. The method of claim 11, wherein the item is injected into the receiving space of the receptacle in a direction that intersects the front side of the receptacle at an angle less than 45 degrees.

16. The method of claim 11, wherein the item is injected from an injector before the impact surface is positioned between the front side and the back side of the receptacle.

17. The method of claim 11, further comprising guiding the item toward the impact surface within the receptacle before impacting the item.

18. The method of claim 11, further comprising:
continuously moving the receptacle over a second impact surface on a stationary bumper;
injecting a second item into the receiving space of the receptacle; and
impacting the second item such that an impact force of the second item is absorbed by the second impact surface,
wherein the continuous movement of the receptacle and the injection of the second item are coordinated such that the second impact surface is positioned between the front side and the back side of the receptacle during the impact of the second item.

* * * * *